United States Patent
Takada et al.

(10) Patent No.: US 9,975,459 B2
(45) Date of Patent: May 22, 2018

(54) HEADREST DEVICE AND SOUND COLLECTING DEVICE

(71) Applicants: CLARION CO., LTD., Saitama (JP); TACHI-S CO., LTD., Tokyo (JP)

(72) Inventors: Naoki Takada, Saitama (JP); Fumiaki Nakashima, Saitama (JP); Takao Ishikawa, Saitama (JP); Takahiko Nagasawa, Tokyo (JP); Yasuyuki Ito, Tokyo (JP); Junpei Yoshikawa, Tokyo (JP)

(73) Assignees: CLARION CO., LTD., Saitama-Shi, Saitama (JP); TACHI-S CO., LTD., Akishima-Shi, Tokyo (JP)

( * ) Notice: Subject to any disclaimer, the term of this patent is extended or adjusted under 35 U.S.C. 154(b) by 74 days.

(21) Appl. No.: 15/036,955

(22) PCT Filed: Nov. 7, 2014

(86) PCT No.: PCT/JP2014/079550
§ 371 (c)(1),
(2) Date: May 16, 2016

(87) PCT Pub. No.: WO2015/076120
PCT Pub. Date: May 28, 2015

(65) Prior Publication Data
US 2016/0257227 A1    Sep. 8, 2016

(30) Foreign Application Priority Data
Nov. 19, 2013 (JP) ................... 2013-239379

(51) Int. Cl.
*A47C 7/62* (2006.01)
*B60N 2/48* (2006.01)
(Continued)

(52) U.S. Cl.
CPC .......... *B60N 2/4876* (2013.01); *B60N 2/879* (2018.02); *B60R 11/0217* (2013.01);
(Continued)

(58) Field of Classification Search
CPC ..... B60N 2/48; B60N 2/4876; B60R 11/0217; B60R 11/0297
(Continued)

(56) References Cited

U.S. PATENT DOCUMENTS 5,133,017 A * 7/1992 Cain ................. G01R 33/3854
381/71.4
6,356,645 B1 * 3/2002 Trenkle ............... B60R 11/0217
181/141
(Continued)

FOREIGN PATENT DOCUMENTS

CN  1516441 A   7/2004
CN  203093803 A   7/2013
(Continued)

OTHER PUBLICATIONS

Extended European Search Report mailed by European Patent Office dated Jun. 28, 2017 in the corresponding European patent application No. 14863683.0-1754/3072733.
(Continued)

*Primary Examiner* — Chi Q Nguyen
(74) *Attorney, Agent, or Firm* — IP Business Solutions, LLC

(57) ABSTRACT

To make it possible to provide an acoustic device in a headrest device such that a standard of a shock is satisfied and the performance of the acoustic device can be efficiently exhibited. In the headrest device, a shock resistant surface is formed in a core material of a headrest main body, an
(Continued)

opening is formed in the shock resistant surface, and a non-contact type acoustic microphone is disposed on the inner side of the opening.

14 Claims, 18 Drawing Sheets

(51) Int. Cl.
 *B60R 11/02* (2006.01)
 *B60R 11/00* (2006.01)
(52) U.S. Cl.
 CPC ...... *B60R 11/0223* (2013.01); *B60R 11/0247* (2013.01); *B60R 2011/0017* (2013.01); *B60R 2011/0043* (2013.01)
(58) Field of Classification Search
 USPC ............. 297/217.4, 391, 217.3, 217.5, 217.1
 See application file for complete search history.

(56) References Cited

U.S. PATENT DOCUMENTS

| | | | | |
|---|---|---|---|---|
| 6,445,408 | B1* | 9/2002 | Watkins | B60N 2/4876 224/275 |
| 2003/0081795 | A1 | 5/2003 | Hirao | |
| 2003/0142842 | A1 | 7/2003 | Arai et al. | |
| 2006/0250017 | A1* | 11/2006 | Otto | B60N 2/4864 297/410 |
| 2008/0236452 | A1* | 10/2008 | Pratt | A47B 85/00 108/13 |
| 2008/0260174 | A1* | 10/2008 | Yokota | G10K 11/178 381/71.4 |
| 2008/0273713 | A1 | 11/2008 | Hartung et al. | |
| 2008/0273724 | A1 | 11/2008 | Hartung et al. | |
| 2008/0292121 | A1 | 11/2008 | Yokota | |
| 2016/0100250 | A1* | 4/2016 | Baskin | B60N 2/4876 297/217.4 |
| 2017/0080876 | A1* | 3/2017 | Chang | B60R 11/0229 |

FOREIGN PATENT DOCUMENTS

| | | | |
|---|---|---|---|
| CN | 103310796 | A | 9/2013 |
| JP | H04-081340 | A | 3/1992 |
| JP | H04-308899 | A | 10/1992 |
| JP | H07-281675 | A | 10/1995 |
| JP | H11-342799 | A | 12/1999 |
| JP | 2001-146136 | A | 5/2001 |
| JP | 2001-260763 | A | 9/2001 |
| JP | 2003-111640 | A | 4/2003 |
| JP | 2004-083004 | A | 3/2004 |
| JP | 2006254376 | A | 9/2006 |
| JP | 2007278824 | A | 10/2007 |
| JP | 4189917 | B2 | 9/2008 |
| JP | 2009-291454 | A | 12/2009 |
| WO | 2009/012500 | A2 | 1/2009 |
| WO | 2009/012501 | A2 | 1/2009 |
| WO | 2010058231 | A1 | 5/2010 |

OTHER PUBLICATIONS

International Search Report issued for corresponding PCT/JP2014/079550 application.
Written Opinion of the International Search Authority issued for corresponding PCT/JP2014/079550 application.
International Preliminary Report on Patentability issued for corresponding PCT/JP2014/079550 application.
Notice of Reasons for Refusal mailed by Japan Patent Office dated Aug. 30, 2016 in the corresponding Japanese patent application No. 2015-549069.
Notice of Reasons for Refusal mailed by the Patent Office of the People's Republic of China dated Feb. 21, 2017 in the corresponding Chinese patent application No. 2014800631312.
Chinese Office Action mailed by Chinese Patent Office dated Nov. 16, 2017 in the corresponding Chinese patent application No. 2014800631312.
Japanese Office Action mailed by Japanese Patent Office dated Jan. 9, 2018 in the corresponding Japanese patent application No. 2017042535.

* cited by examiner

HEADREST DEVICE AND SOUND COLLECTING DEVICE

TECHNICAL FIELD

The present invention relates to a headrest device and a sound collecting device.

BACKGROUND ART

There has been known a headrest device in which a vibration pickup-type microphone is provided in a headrest of a seat to detect voice of a seated person from a bone conduction signal (see, for example, Patent Literature 1).

CITATION LIST

Patent Literature

Patent Literature 1: Japanese Patent Application Laid-Open No. 2004-83004

SUMMARY OF INVENTION

Technical Problem

Incidentally, there is a standard that, in a headrest device, a shock at the time when the head of a seated person presses a headrest has to be reduced to a predetermined value or less. However, in a configuration in which a speaker functioning as an acoustic device is provided in the headrest or a microphone functioning as an acoustic device is provided in the vicinity of the front surface of the headrest as in the conventional headrest, the acoustic device touches the head to cause a shock. Therefore, it is difficult to satisfy the standard. It is desired that the acoustic device is provided in the headrest such that the performance of the acoustic device can be efficiently exhibited.

The present invention has been devised in view of the circumstances and it is an object of the present invention to make it possible to provide an acoustic device in a headrest device and a headrest such that a standard of a shock is satisfied and the performance of the acoustic device can be efficiently exhibited.

Solution to Problem

This specification includes the entire content of Japanese Patent Application No. 2013-239379 filed on Nov. 19, 2013.

In order to attain the object, the present invention provides a headrest device in which a shock resistant surface is formed in a core material of a headrest main body, an opening is formed in the shock resistant surface, and a non-contact type acoustic microphone is disposed on the inner side of the opening.

In the configuration, the acoustic microphone may be disposed in a form adapted to a test performed using a head form provided for in details of a safety standard for a road transport vehicle.

A sound collecting mechanism may be disposed between the opening of the core material and the acoustic microphone.

The sound collecting mechanism may be configured by a substantially conical sound collecting section.

Further, the opening may be formed on the front surface of the headrest main body.

A plurality of acoustic speakers may be disposed around the acoustic microphone, and the acoustic speakers may be disposed outward with respect to the acoustic microphone.

The front of the acoustic microphone may be covered with a material that allows sound to easily pass.

A plurality of the acoustic microphones may be disposed side by side in the lateral direction.

A plurality of the acoustic microphones may be disposed side by side in the longitudinal direction.

The present invention provides a sound collecting device including: an attachment section attached to a headrest stay that connects a headrest of a seat to a seat back section; and a non-contact type acoustic microphone supported by the attachment section.

Further, the attachment section may include a sound collecting section opened to a seated person side, and the acoustic microphone may be disposed in the sound collecting section.

The sound collecting section may be formed in a substantially conical/pyramid shape.

The attachment section may be attached between a pair of the headrest stays, and the acoustic microphone may be disposed in an intermediate section between the pair of headrest stays.

A plurality of the acoustic microphones may be disposed side by side in the lateral direction.

A plurality of the acoustic microphones may be disposed side by side in the longitudinal direction.

Advantageous Effects of Invention

According to the present invention, it is possible to provide an acoustic device in a headrest device and a headrest such that a standard of a shock is satisfied and the performance of the acoustic device can be efficiently exhibited.

DESCRIPTION OF EMBODIMENTS

Embodiments of the present invention are explained below with reference to the drawings.

First Embodiment

Figure 1:
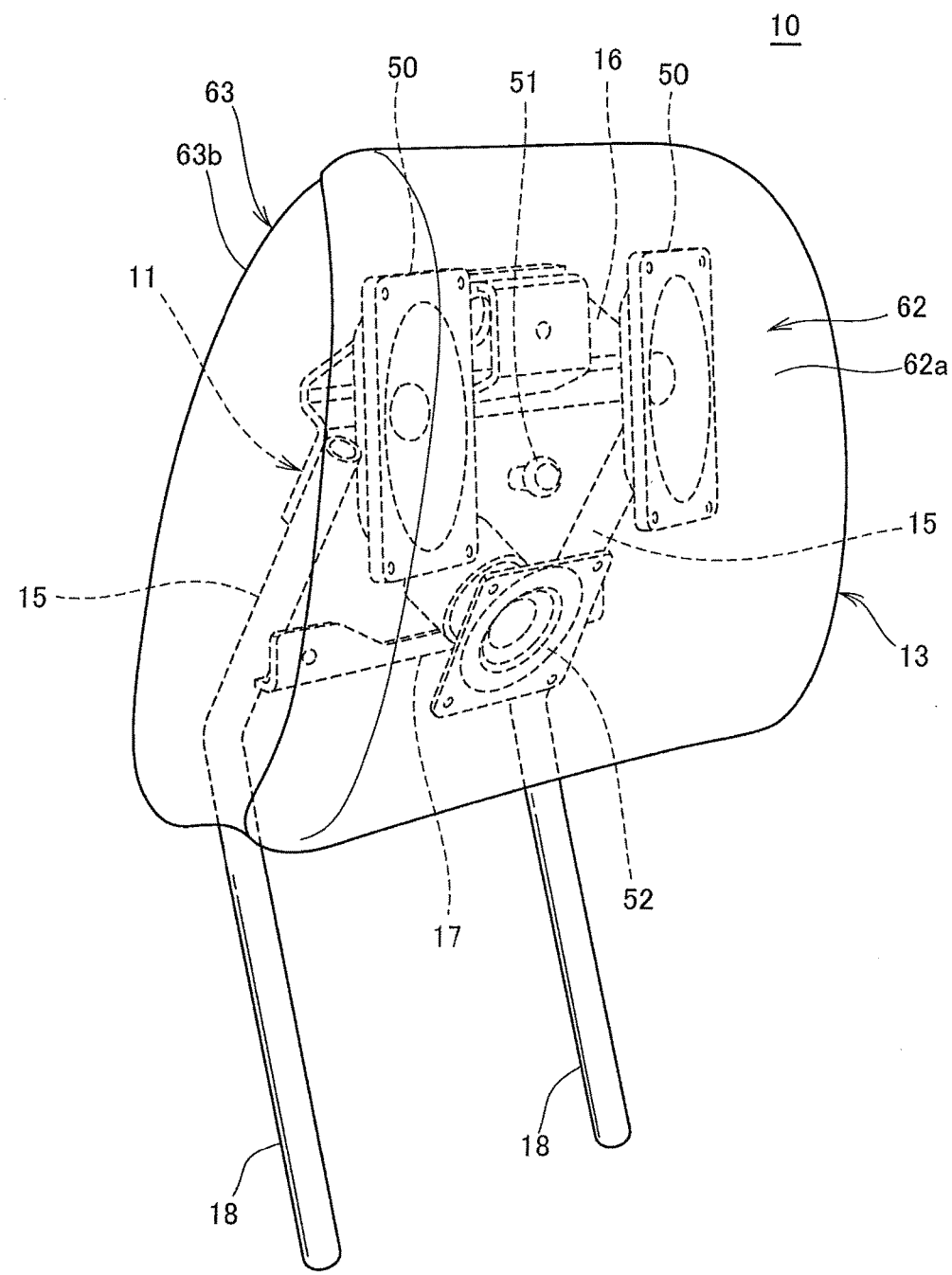
FIG. 1 is a perspective view showing a headrest device according to an embodiment of the present invention.
Figure 2:
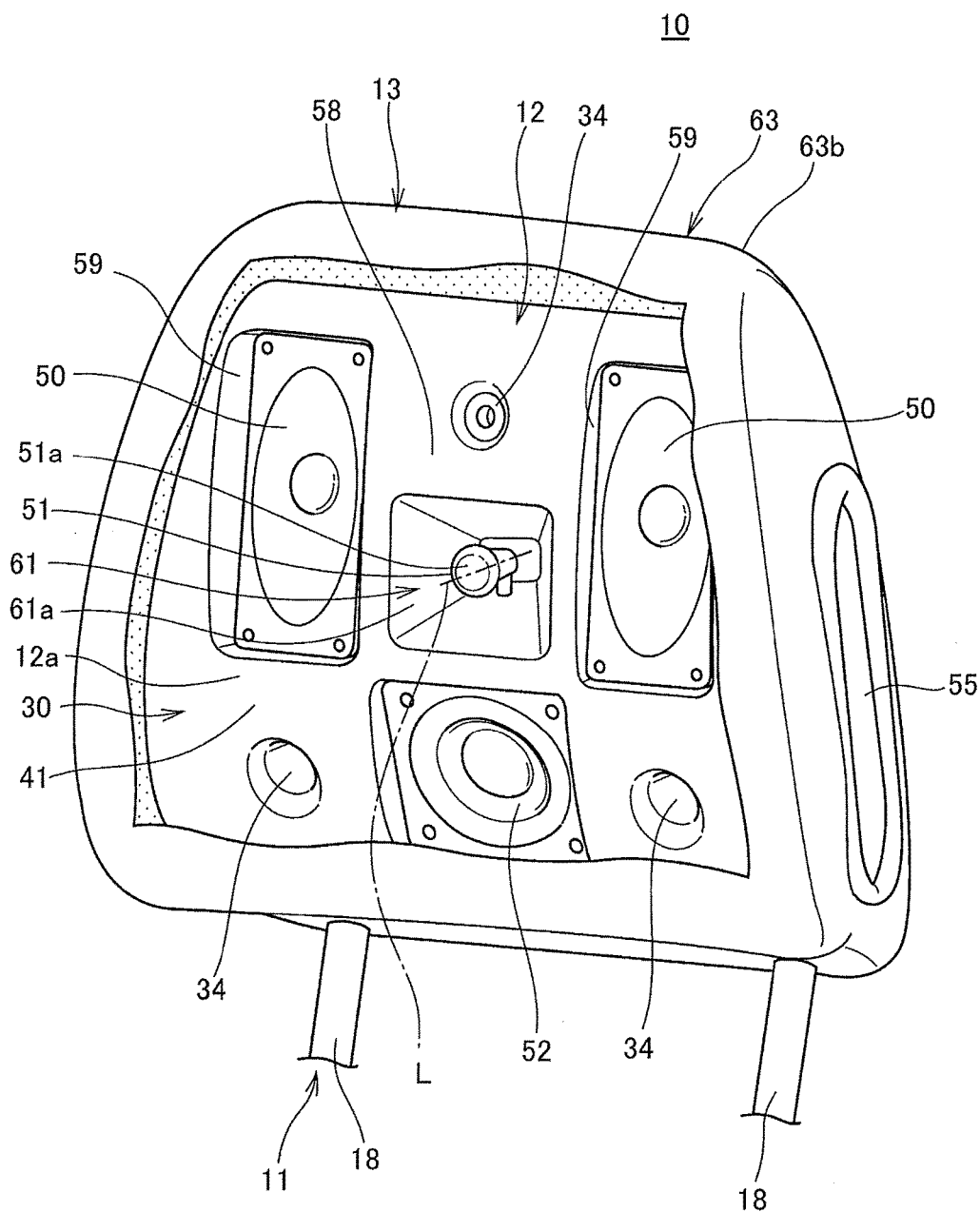
FIG. 2 is a perspective view showing the headrest device.

FIG. 1 and FIG. 2 are perspective views showing a headrest device 10 according to a first embodiment of the present invention. In FIG. 1, illustration of a cushion core material 12 explained below is omitted. In FIG. 2, illustration of the front surface of a cushion 13 explained below is omitted.

The headrest device 10 is provided in a seat for an occupant disposed in a vehicle interior. Examples of the vehicle interior include vehicle interiors of an automobile, a train, an airplane, and a ship. In the first embodiment, the headrest device 10 provided in a seat, which is a front seat of an automobile and in which a driver is seated, is explained as an example. Examples of the automobile include, besides an ordinary four-wheeled vehicle, a small electric automobile not including side doors.

A seat (not shown in the figure) includes a seat surface section (not shown in the figure) on which a driver (a seated person) is seated, a seat back section (not shown in the figure) extending upward in a posture slightly inclining backward from the rear end of the seat surface section, and the headrest device 10 attached to the upper end of the seat back section.

The headrest device 10 includes an acoustic speaker 50 and an acoustic microphone 51 and includes a communication section (not shown in the figure) that enables the headrest device 10 to cooperate with other devices (not shown in the figure) such as a portable terminal through short-range radio communication. Examples of the other devices include a cellular phone, a smart phone, and a tablet terminal. Examples of the short-range radio communication include Bluetooth (a short-range radio communication standard: registered trademark). Note that the headrest device 10 and the other devices can be connected by not only the short-range radio communication but also, for example, a wire.

In a state in which the headrest device 10 cooperates with the other devices, the headrest device 10 outputs, from the acoustic speaker 50, as sound, sound data of contents read out from the other devices, guidance sound data for guiding a vehicle to a destination, and the like. In the state in which the headrest device 10 cooperates with the other devices, the seated person can operate the other devices using, as a voice command, voice collected by the acoustic microphone 51 and make a call in a hand-free manner via the acoustic microphone 51.

The headrest device 10 includes a frame 11 functioning as a framework of the headrest device 10, a cushion core material 12 (a core material) functioning as a headrest main body coupled to the frame 11, and a cushion 13 provided to cover the periphery of the cushion core material 12 to receive the head of the seated person. In the first embodiment, the headrest main body is a cushion core material 12. However, the headrest main body only has to be covered with the cushion 13 of the outermost layer and may include other members in addition to the cushion core material 12.

Figure 3:
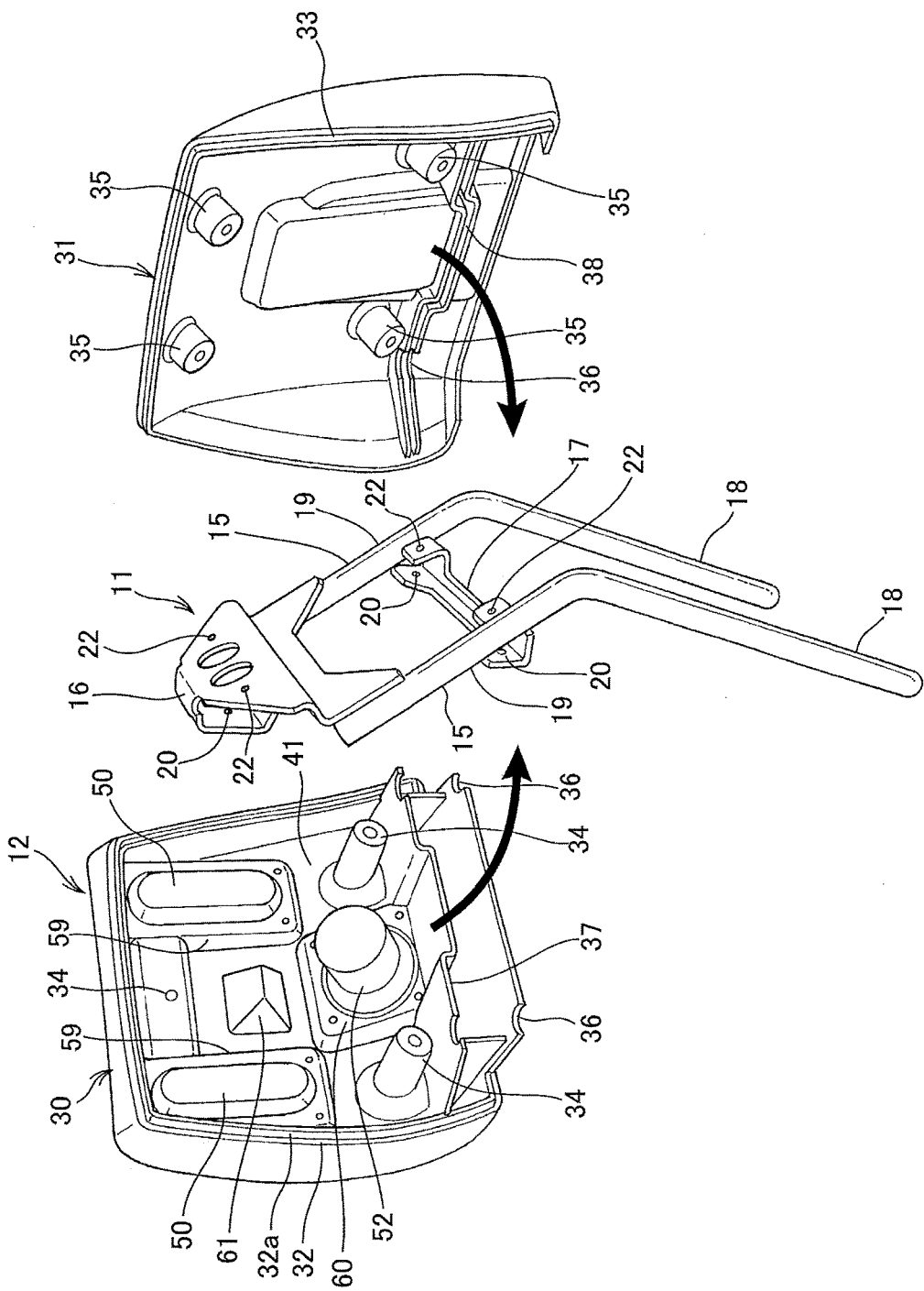
FIG. 3 is an exploded perspective view of a headrest main body.

FIG. 3 is an exploded perspective view of the cushion core material 12 and the frame 11.

The frame 11 includes a pair of main frames 15, 15 disposed side by side in the left-right direction and extending in the up-down direction, an upper cross member 16 that couples the upper end portions of the main frames 15, 15 to the left and right, and a lower cross member 17 that couples the main frames 15, 15 to the left and right below the upper cross member 16. The frame 11 is made of metal.

Each of the main frames 15, 15 is formed in a pipe shape and the main frames 15, 15 include stay sections 18, (attachment stays) extending upward substantially in parallel to the seat back section and inner frame sections 19, 19 bent forward at the upper ends of the stay sections 18, 18 and extending upward in a slightly forward-bent posture.

The inner frame sections 19, 19 are located on the inside of the headrest device 10 on the inner side of the cushion 13. The stay sections 18, 18 are inserted into attachment hole sections (not shown in the figure) formed in the upper surface of the seat back section and are fixed to the seat. The headrest device 10 is configured to be capable of changing a height position of attachment according to a physique or the like of the seated person by adjusting insertion depth of the stay sections 18, 18 into the attachment hole sections.

The cushion core material 12 is formed in a sealed box shape by joining a substantially box-shaped front side case 30, which is opened in the rear surface, and a substantially box-shaped rear side case 31, which is opened in the front surface, each other in the openings thereof. The cushion core material 12 is formed in a substantially rectangular parallelepiped shape long in the up-down direction and the left-right direction and short in the front-back direction. The front side case 30 and the rear side case 31 are resin molded products.

The front side case 30 and the rear side case 31 respectively have joining surfaces 32, 33 in peripheral edge portions of the openings. Specifically, the joining surface 33 of the rear side case 31 fits in a groove section 32a formed in the joining surface 32 of the front side case 30, whereby the joining surfaces 32 and 33 are closed. A frame-like gasket (not shown in the figure) is interposed between the joining surfaces 32, 33 to improve a sealing property. The joining surfaces 32, 33 may be joined and sealed by, for example, ultrasonic welding.

A plurality of fixing hole sections 20 are provided on the front surfaces of the upper cross member 16 and the lower cross member 17. Front side case fixing bolts (FIG. 5) for fixing the front side case 30 to the frame 11 are fastened to the fixing hole sections 20. A plurality of fixing hole sections 22 are provided on the rear surfaces of the upper cross member 16 and the lower cross member 17. Rear side case fixing bolts 23 (FIG. 4) for fixing the front side case 30 to the frame 11 are fastened to the fixing hole sections 22.

The front side case 30 includes a plurality of fixing sections 34 through which the front side case fixing bolts 21 are inserted. The rear side case 31 includes a plurality of fixing sections 35 through which the rear side case fixing bolts 23 are inserted. Specifically, the fixing sections 34, 35 are formed in a bottomed cylindrical shape recessed to the inner side of the cushion core material 12. The front side case fixing bolts 21 and the rear side case fixing bolts 23 are inserted through the bottom sections of the cylindrical shape.

The front side case 30 and the rear side case 31 are disposed to hold the frame 11 from the front and the back and fit the joining surfaces 32, 33 each other and are fixed to the frame 11 by the front side case fixing bolts 21 and the rear side case fixing bolts 23 provided from the outer side. That is, an upper part of the frame 11 is located on the inside of the cushion core material 12 formed to be hollow.

The cushion core material 12 includes, in a lower part, stay pierce-through holes 36, 36 through which the stay sections 18, 18 pierce downward. A seal member (not shown in the figure) is provided between the stay pierce-through holes 36, 36 and the stay sections 18, 18. A sealing property of the inside of the cushion core material 12 is secured.

Figure 4:
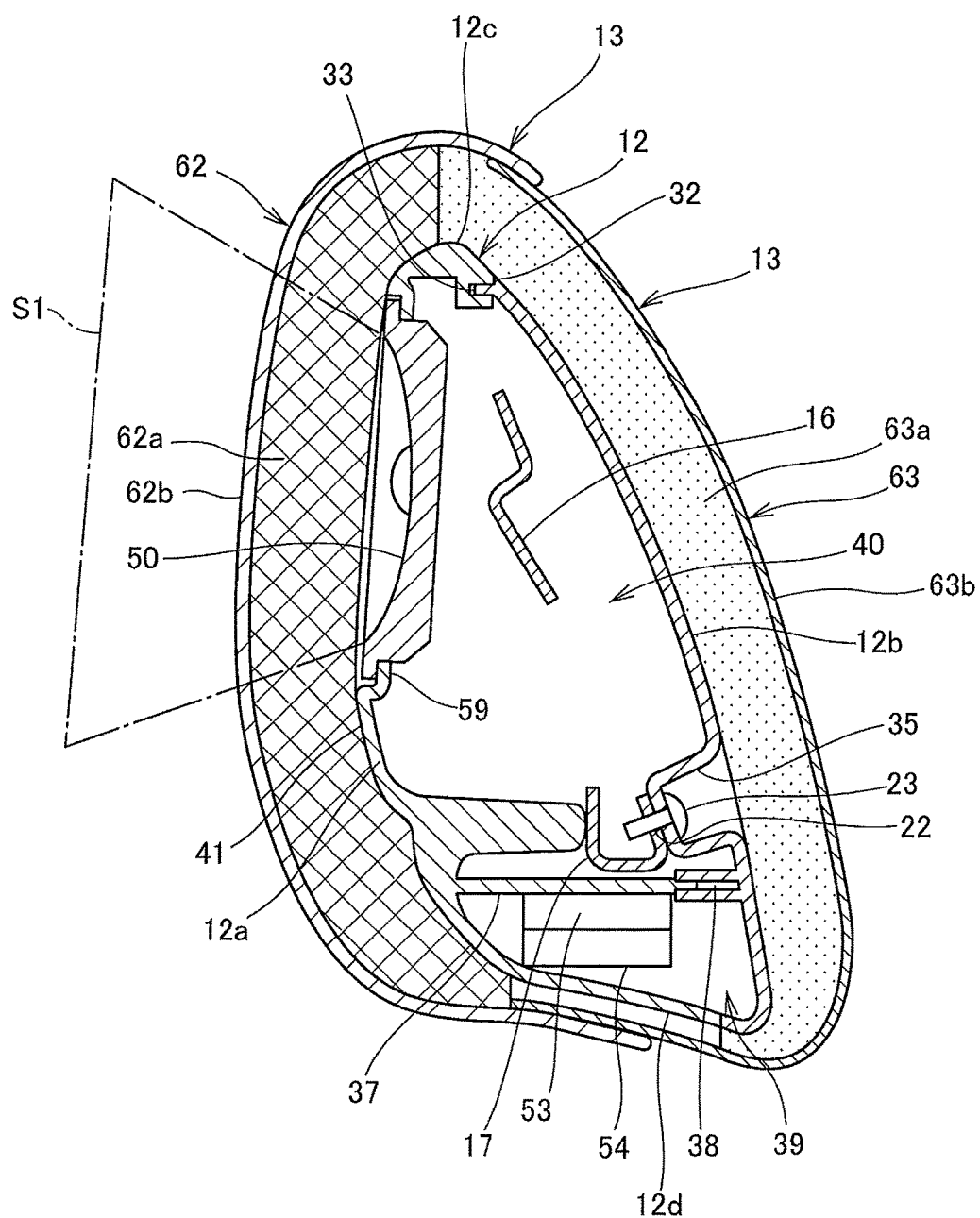
FIG. 4 is a longitudinal sectional view of the headrest device.
Figure 5:
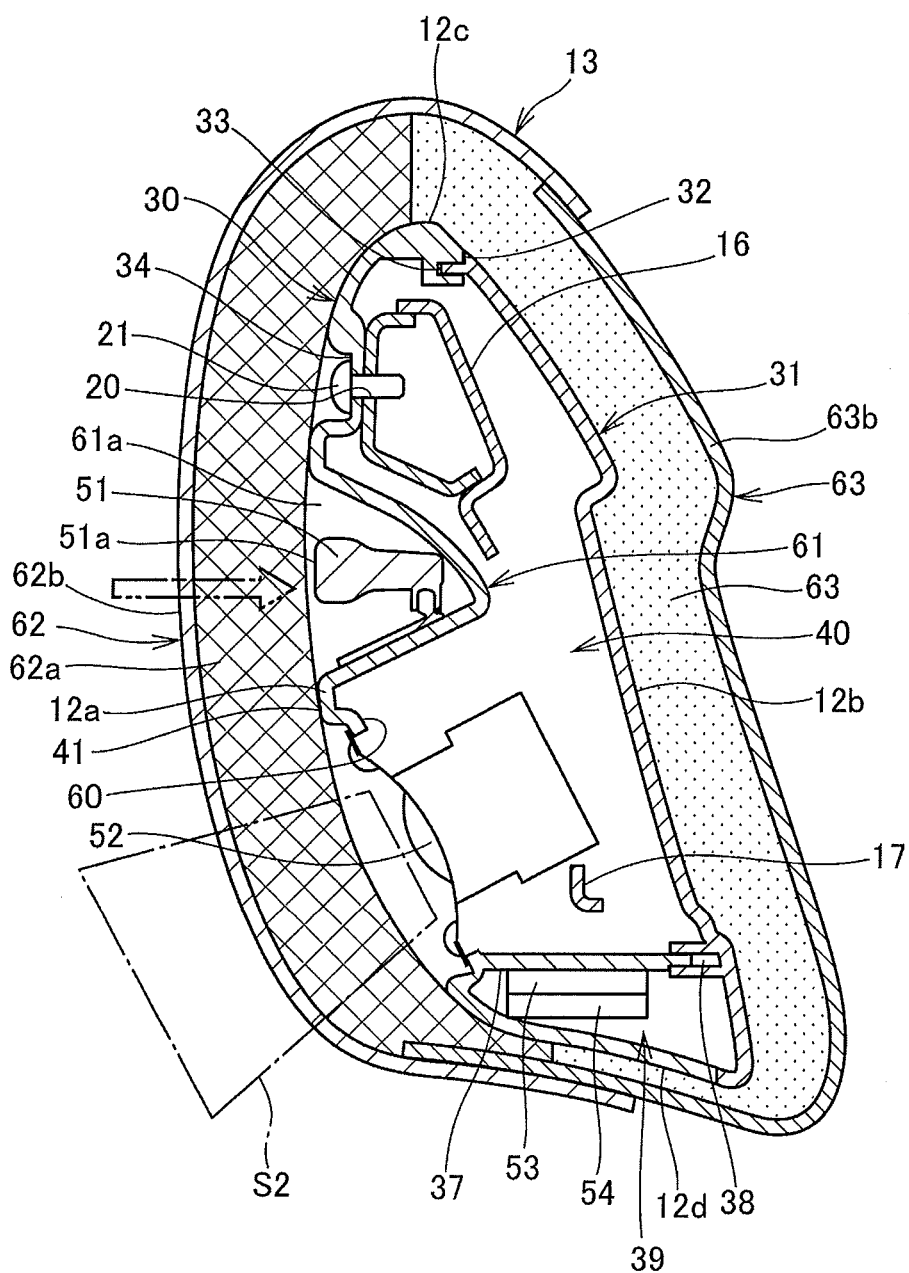
FIG. 5 is a longitudinal sectional view of the headrest device.
Figure 6:
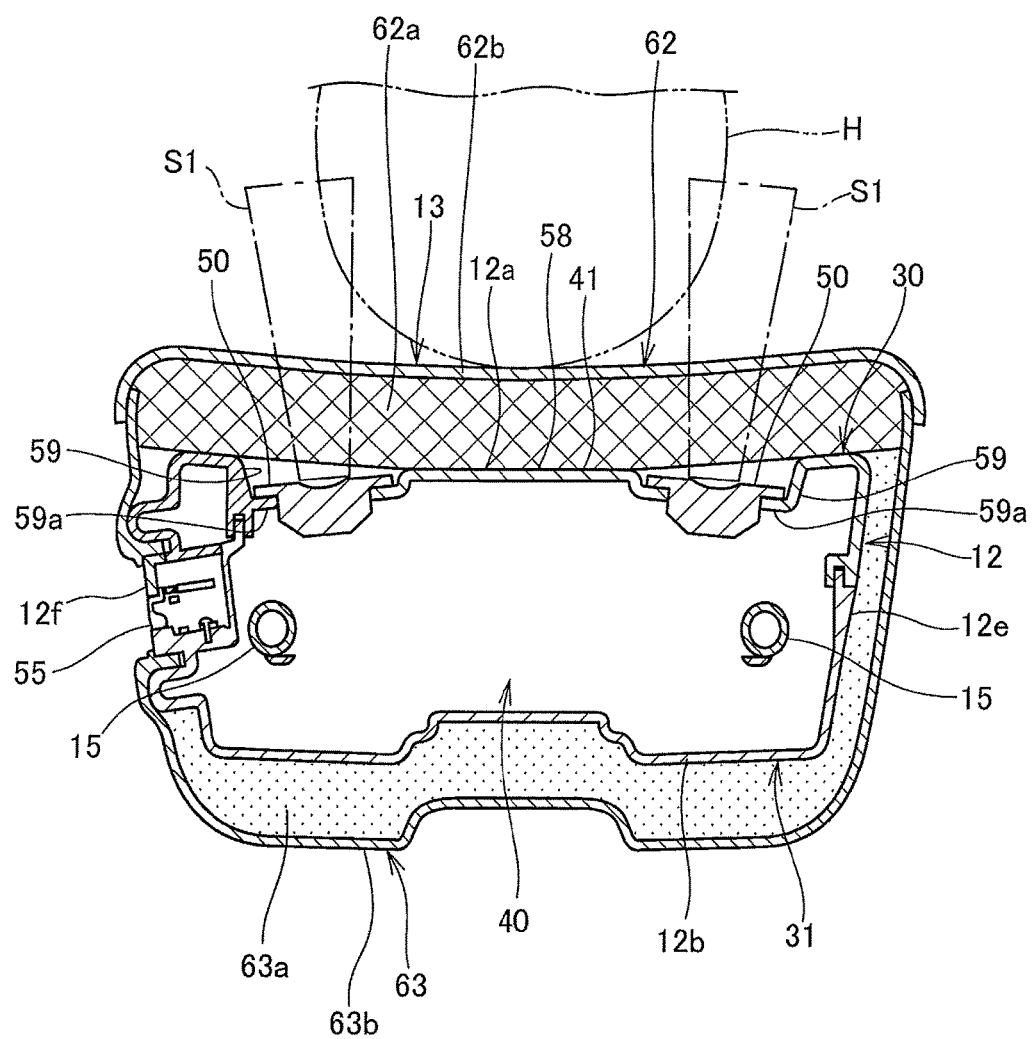
FIG. 6 is a lateral sectional view of the headrest device.

FIG. 4 is a longitudinal sectional view of the headrest device 10. FIG. 5 is a longitudinal sectional view of the headrest device 10. FIG. 6 is a lateral sectional view of the headrest device 10. In FIG. 4 and FIG. 6, a cross section of a position passing the acoustic speaker 50 is shown. In FIG. 5, a cross section of the center in the width direction of the headrest device 10 is shown.

Referring to FIG. 3 to FIG. 6, the front side case 30 includes, in a lower part of the inside, a partition plate section 37 extending substantially horizontally to the rear side case 31 side. The rear side case 31 includes, in a lower part on the inside, an engaging section 38 in which the rear end of the partition plate section 37 fits.

A space on the inside of the cushion core material 12 is partitioned into a housing section 39 in a lower part and an enclosure section 40 (a hollow section) above the housing section 39 by the partition plate section 37. The enclosure section 40 has a space wider than the housing section 39.

The cushion core material 12 includes a front surface 12a (a part of a surface) facing the back of the head H of the seated person, a rear surface 12b, a top surface 12c, a lower surface 12d, a right side surface 12e, and a left side surface 12f.

In the cushion core material 12, a pair of left and right acoustic speakers 50, 50, an acoustic microphone 51, and a sub-woofer 52 are provided. Specifically, the acoustic speakers 50, 50, the acoustic microphone 51, and the sub-woofer 52 are attached to an acoustic-device attachment surface 41, which is the front surface of the enclosure section 40, on the front surface 12a.

The cushion core material 12 includes a control section 53 that controls the acoustic speakers 50, 50, the acoustic microphone 51, and the sub-woofer 52 and a rechargeable battery 54 that supplies electric power to the acoustic speaker 50, the acoustic microphone 51, the sub-woofer 52, and the control section 53. The control section 53 and the battery 54 are housed in the housing section 39. The communication section is included in the control section 53.

On the left side surface 12f of the cushion core material 12, an interface section 55 on which connection terminals to the control section 53 and the battery 54 from the outside, a power switch, and the like are disposed is provided.

The headrest device 10 includes the battery 54 and is provided separately and detachably from the seat back section of the seat. The headrest device 10 is independently movable.

Figure 7:
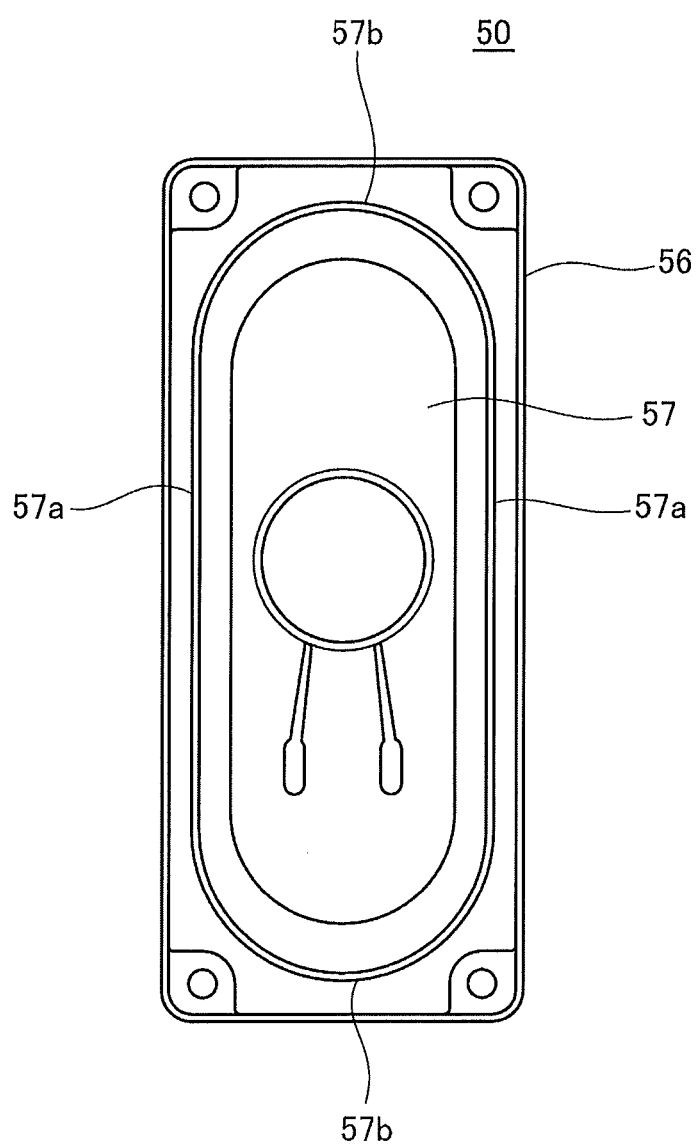
FIG. 7 is a front view of an acoustic speaker.

FIG. 7 is a front view of the acoustic speaker 50.

Each of the acoustic speakers 50 includes a frame section 56 having a substantially rectangular shape, a vibration plate 57 supported by the frame section 56, and a driving section (not shown in the figure) configured by a voice coil, a magnet, and the like to drive the vibration plate 57.

The vibration plate 57 is formed in an elliptical shape (a race track shape) more elongated in the up-down direction than in the left-right direction. Specifically, the exterior of the vibration plate 57 includes left right side edges 57a, 57a linearly vertically extending in parallel to each other and semicircular arc sections 57b, 57b that respectively connect the left and right side edges 57a, 57a at the upper ends and the lower ends thereof.

As shown in FIG. 2 and FIG. 6, the acoustic-device attachment surface 41 is a shock resistant surface that receives the back of the head H of the seated person. The acoustic-device attachment surface 41 includes a receiving surface section 58 formed substantially flat in plan view in the center in the width direction of the headrest device 10 and speaker housing recesses 59, 59 recessed one step to the inner side of the enclosure section 40 on the left and right sides of the receiving surface section 58. Bottom surfaces 59a of the speaker housing recesses 59, 59 incline to be deeper further on the outer side in the width direction of the headrest device 10 and include opening sections in which the acoustic speakers 50, 50 fit. The acoustic speakers 50, 50 are attached to the inclining bottom surfaces 59a via the frame section 56 to be disposed to incline outward. Sound S1 of the acoustic speakers 50, 50 is output forward from openings on the front surfaces of the speaker housing recesses 59, 59.

As shown in FIG. 6, the acoustic speakers 50, 50 are disposed in the left and right edge portions of the acoustic-device attachment surface 41 to be located on the left and right sides of the back of the head H and are disposed such that the longitudinal direction thereof is directed to the up-down direction. The acoustic speakers 50, 50 are disposed with the vibration plate 57 directed forward to be capable of outputting sound substantially horizontally and are disposed to incline outward such that the output sound spread further to the left and right outer sides toward the front side.

Since the vertically-elongated acoustic speakers 50, 50 are provided in the headrest device 10 in this way, it is possible to reduce the lateral width of the headrest device 10 while keeping the size of the entire vibration plate 57. Therefore, it is possible to secure sound quality. Further, when the seated person checks the back, the headrest device 10 does not obstruct the view and rear visibility is high. The lateral width of the headrest device 10 does not increase even if the headrest device 10 includes the acoustic speakers 50, 50. Therefore, versatility is high and the headrest device 10 is applicable to various car models.

Since the acoustic speakers 50, 50 are vertically elongated, as shown in FIG. 4 and FIG. 6, the sound S1 of the acoustic speakers 50, 50 is output in a narrow range in the left-right direction and is output in a wide range in the up-down direction. That is, the directivity of the sound S1 of the acoustic speakers 50, 50 is narrow in the left-right direction and, in the up-down direction, wider than in the left-right direction.

Consequently, it is possible to output the sound S1 in a wide range in the up-down direction. It is possible to always provide the seated person with sound with high sound quality without being affected by a height position of the head of the seated person and upper and lower adjustment positions of the headrest device 10. The sound S1 less easily spreads in the left-right direction. Therefore, it is possible to provide the seated person with a personal acoustic space. It is possible to suppress sound output by the headrest device 10 from reaching a seat side next to the seated person.

Further, the acoustic speakers 50, 50 are disposed to incline outward such that the output sound S1 further spread to the left and right outer sides toward the front side. Therefore, even in a configuration in which the left and right interval of the acoustic speakers 50, 50 is reduced to reduce the headrest device 10 in size, it is possible to spread sound to the left and right to reach the ears of the seated person. It is possible to cause the seated person to feel a satisfactory stereophonic sense.

In the first embodiment, the acoustic speakers 50, 50 are supported by the cushion core material 12 to use the enclosure section 40 of the sealed hollow cushion core material 12 as an enclosure that reinforces a low tone. Therefore, it is unnecessary to provide a dedicated enclosure. It is possible to simplify the structure of the acoustic speakers 50, 50. Since the cushion core material 12 including the relatively large inner space is used as the enclosure, sound quality is high.

Further, the pipe-like main frames 15, 15 can be used as a low tone duct that causes the enclosure section 40 and the outer space to communicate. In this case, for example, it is possible to circulate the air to the inside and the outside of the enclosure section 40 via the upper ends of the main frames 15, 15 opened in the enclosure section 40 and openings of the lower ends of the main frames 15, 15 opened in the outer space. Consequently, it is possible to improve the sound quality without providing a dedicated duct.

As shown in FIG. 3 and FIG. 5, the acoustic-device attachment surface 41 includes, in a lower part, a woofer attachment surface 60 to which the sub-woofer 52 is attached. Specifically, the woofer attachment surface 60 is provided in the center in the width direction of the cushion core material 12 below the speaker housing recesses 59, 59 and inclines to be directed front downward. The sub-woofer 52 is attached to the woofer attachment surface 60 to be directed front downward and outputs sound S2 front downward. A vibration plate of the sub-woofer 52 is driven by a driving section (not shown in the figure) controlled by the control section 53. Since the sub-woofer 52 is provided downward in this way, effects are obtained in that it is possible to transmit sound to a lower portion of the body of the seated person and cause the seated person to easily feel a low tone.

As shown in FIG. 2, FIG. 3, and FIG. 5, the receiving surface section 58 of the acoustic-device attachment surface 41 includes a sound collecting section 61 recessed toward the inner side of the enclosure section 40. The sound collecting section 61 is disposed in the center portion in the width direction of the headrest device 10 between the acoustic speakers 50, 50, disposed in the center portion in the up-down direction of the headrest device 10 above the sub-woofer 52, and located behind the back of the head H. The sound collecting section 61 is formed in a substantially conical shape tapered toward the rear end side. An axis (not shown in the figure) of the substantially conical shape of the sound collecting section 61 extends forward substantially horizontally. A sound collection opening section 61a for capturing sound into the sound collecting section 61 is formed on the front surface of the sound collecting section 61. Note that the sound collecting section 61 only has to be formed in a shape capable of collecting sound and is not limited to the substantially conical shape. The sound collecting section 61 may be formed in a shape such as a substantially pyramid shape or a substantially conical trapezoidal shape.

The acoustic microphone 51 is disposed in the sound collecting section 61. Specifically, the acoustic microphone 51 is formed in a columnar shape. The acoustic microphone 51 is disposed in the center of the sound collecting section 61 such that an axis L of the acoustic microphone 51 substantially coincides with the axis of the sound collecting section 61. By providing the acoustic microphone 51 in the sound collecting section 61 in this way, it is possible to efficiently collect sound in the acoustic microphone 51. Therefore, it is possible to surely receive, with the acoustic microphone 51, even voice emitted forward by the seated person.

The acoustic microphone 51 is disposed in a position closest to the surface of the back of the head H in the vertical center portion of the headrest device 10. Voice of the seated person is radiated to the air by vibration of not only the mouth and the nostrils but also the surface of the head. Therefore, as in the first embodiment, by disposing the acoustic microphone 51 near the head, it is possible to efficiently collect the voice of the seated person with the acoustic microphone 51.

In the conventional configuration in which the bone conduction-type microphone is incorporated in the headrest, sound cannot be sufficiently collected unless at least the head is in contact with the headrest. In the vehicle, usually, the seated person rarely drives the vehicle or performs other action while placing the head in contact with the headrest. Therefore, it is difficult to collect sound. However, in the first embodiment, it is possible to collect sound with the acoustic microphone 51 even if the head is not in contact with the headrest device 10. Therefore, convenience of use is high.

The voice of the seated person is not only directly collected by the acoustic microphone 51 from the seated person but also reflected by an object such as a windshield in the periphery to thereby be collected by the acoustic microphone 51. Since sound is collected from the sound collection opening section 61a opened in the front, it is possible to suppress sound from the side and the back from being collected by the acoustic microphone 51. It is possible to accurately receive the voice of the seated person. That is, the sound collecting section 61 configures a sound collecting mechanism for preferentially collecting sound from the front.

The acoustic microphone 51 is disposed in a deep position in the sound collecting section 61. A front end 51a of the acoustic microphone 51 is located further backward than the surface of the receiving surface section 58. Therefore, it is possible to prevent the back of the head H from coming into contact with the acoustic microphone 51.

The acoustic microphone 51 and the acoustic speakers 50, 50 are considered to satisfy a technical standard, specifically, "An announcement for providing for details of a safety standard for a road transport vehicle (Nov. 9, 2005) Attachment 30 (A technical standard for a seat and a seat attachment device)".

In the first embodiment, the acoustic speakers 50, 50, the sub-woofer 52, and the acoustic microphone 51 are disposed to meet an internal protrusion requirement and an R (curvature radius) requirement of the safety standard. Specifically, since the acoustic microphone 51 is disposed in the deep position in the sound collecting section 61, the acoustic microphone 51 is disposed such that a sphere (a head form) for measurement having a diameter of 165 mm less easily comes into contact with the acoustic microphone 51 and, even if the sphere comes into contact with the acoustic microphone 51, a contact portion meets the R requirement.

The acoustic speakers 50, 50 are disposed in deep positions in the speaker housing recesses 59, 59. The sub-woofer 52 is also disposed in a deep position from the acoustic-device attachment surface 41. Therefore, the acoustic speakers 50, 50 and the sub-woofer 52 are disposed such that the head form having the diameter of 165 mm less easily comes into contact with the acoustic speakers 50, 50 and the sub-woofer 52 and, even if the head form comes into contact with the acoustic speakers 50, 50 and the sub-woofer 52, contact portions meet the R requirement.

In the first embodiment, since the acoustic microphone 51 is provided on the inner side of the cushion 13, wind flowing into the vehicle does not directly come into contact with the acoustic microphone 51. Therefore, it is possible to prevent the acoustic microphone 51 from collecting wind noise. It is possible to reduce noise input to the acoustic microphone 51.

Since the acoustic microphone 51 is provided in the cushion core material 12, it is possible to provide, in the headrest device 10, a wire that connects the acoustic microphone 51 and the control section 53. It is possible to eliminate a trouble of wiring. Since the acoustic microphone 51 is incorporated in the headrest device 10, the acoustic microphone 51 does not obstruct the seated person.

The acoustic microphone 51 is disposed between the acoustic speakers 50, 50. The acoustic speakers 50, 50 are disposed outward. Therefore, it is possible to prevent the sound S1 of the acoustic speakers 50, 50 from being directly received by the acoustic microphone 51. It is possible to prevent the acoustic microphone 51 from being affected by the sound S1.

Further, the sub-woofer 52 outputs the sound S2 front downward below the acoustic microphone 51. Therefore, it is possible to prevent the sound S2 from being directly received by the acoustic microphone 51. It is possible to prevent the acoustic microphone 51 from being affected by the sound S2. The sub-woofer 52 outputs the sound S2 front downward from the rear side of the back of the head H. Therefore, the sound S2 is mainly transmitted to the seated person via the body of the seated person having a volume larger than the head. Therefore, it is possible to cause the seated person to easily feel a low tone. It is possible to provide a powerful low tone.

Like the acoustic speakers 50, 50, the sub-woofer 52 is supported by the enclosure section 40 of the sealed hollow cushion core material 12. The enclosure section 40 is used as the enclosure that reinforces a low tone. Therefore, it is unnecessary to provide a dedicated enclosure. It is possible to simplify the structure of the sub-woofer 52. Since the cushion core material 12 having a relatively large inner space is used as the enclosure, sound quality is high.

That is, the acoustic speakers 50, 50 and the sub-woofer 52 share the enclosure section 40 of the cushion core material 12 as the enclosure. When the acoustic speakers 50, 50 and the sub-woofer 52 are provided in the same enclosure section 40, it is conceivable that the acoustic speakers 50, 50 and the sub-woofer 52 interfere with each other and affect sound quality. However, the headrest device 10 is provided near the head and an output of sound may be relatively small. Therefore, the influence of the interference is small.

Further, the fixing sections 34 (FIG. 2), through which the front side case fixing bolts 21 are inserted, are respectively provided between the acoustic speakers 50, 50 above the acoustic microphone 51 and on the left and right sides of the sub-woofer 52 below the acoustic speakers 50, 50. Therefore, it is possible to fix, while disposing the acoustic speakers 50, 50, the acoustic microphone 51, and the sub-woofer 52 in a well-balanced state, the front side case 30 with the fixing sections 34 provided in positions where the front side case 30 can be firmly fixed. It is possible to secure a sealing property of the cushion core material 12.

As shown in FIG. 4 to FIG. 6, the cushion 13 includes a front-surface cushion section 62 that covers the front surface 12a of the cushion core material 12 and a rear-side cushion section 63 that covers the remaining surfaces of the cushion core material 12.

The rear-side cushion section 63 covers the rear surface 12b, the right side surface 12e, the left side surface 12f, a rear part of the lower surface 12d, and a rear part of the top surface 12c, which are the remaining surfaces. The front-surface cushion section 62 covers the entire front surface 12a, a front part of the lower surface 12d, and a front part of the top surface 12c. The front-surface cushion section 62 and the rear-side cushion section 63 are joined at edge portions and formed in a bag shape and are attached to the cushion core material 12 to cover the cushion core material 12.

The rear-side cushion section 63 includes two layers of a damping layer 63a formed of a material that damps sound at high efficiency and a sound blocking layer 63b formed of a material having a high sound blocking property.

The damping layer 63a is formed of resin having high sound absorption performance and a high cushion property such as urethane. As urethane, for example, urethane of an open-cell body including a porous structure is used. Consequently, a high sound absorption property is obtained.

The sound blocking layer 63b is formed of a soft resin material that is sewable and has a high damping property of vibration (sound) and a high sound blocking property. The sound blocking layer 63b is formed of, for example, elastomer. As an example, the sound blocking layer 63b is formed of olefin-based thermoplastic elastomer.

The damping layer 63a is an inner layer adhering to the rear surface 12b of the cushion core material 12. The sound blocking layer 63b is an outer layer exposed to the outer side. The outer surface of the damping layer 63a and the inner surface of the sound blocking layer 63b are joined to adhere. The damping layer 63a and the sound blocking layer 63b are integrated. The damping layer 63a is formed thicker than the sound blocking layer 63b.

That is, the rear-side cushion section 63 is formed of a material that has a cushion property of a headrest and can efficiently damp and block sound.

The front-surface cushion section 62 is a three-dimensional net cushion body formed in a three-dimensional net shape by knitting a fiber body and is a so-called fiber pad. Examples of the fiber body include a fiber body of polypropylene and a blended fiber body of polypropylene and polyethylene terephthalate. Specifically, the front-surface cushion section 62 includes a front-surface cushion section main body 62a configured by the three-dimensional net cushion body and a front-surface pad section 62b that covers the surface of the front-surface cushion section main body 62a. The front-surface pad section 62b is configured by the three-dimensional net cushion body having rougher meshes than the front-surface cushion section main body 62a.

The front-surface cushion section 62 has a high cushion property and has high sound permeability and high air permeability through a three-dimensional net structure. That is, the front-surface cushion section 62 is formed of a material that has the cushion property of a headrest and can efficiently allow sound to pass.

The sounds S1 and S2 output forward from the acoustic speakers 50, 50 and the sub-woofer 52 are output forward through the front-surface cushion section 62 having the high sound permeability. On the other hand, sound output backward from the acoustic speakers 50, 50 and the sub-woofer 52 is damped and blocked in the headrest device 10 by the rear-side cushion section 63 and hardly output to the backward outer side. Specifically, the sound output backward from the acoustic speakers 50, 50 and the sub-woofer 52 is first damped and weakened by the damping layer 63a and thereafter damped and blocked by the sound blocking layer 63b. Therefore, it is possible to effectively block sound leaking backward. Consequently, it is possible to supply the sound forward through the front-surface cushion section 62 having the high sound permeability. It is possible to reduce the sound leaking backward with the rear-side cushion section 63. Therefore, it is possible to provide the seated person with a personal acoustic space.

The substantially front surface of the front-surface cushion section 62 is formed of a material having high sound permeability. Compared with a configuration in which sound passing holes or the like are provided in a part of the cushion, it is possible to reduce the influence of the front-surface cushion section 62 on sound. Therefore, the sound quality of the headrest device 10 is high. In the configuration in which the sound passing holes or the like are provided, it is conceivable that the sound passing holes are closed by the head. In this case, sound quality is deteriorated. On the other hand, in the first embodiment, the substantially front surface of the front-surface cushion section 62 is formed of the material having the high sound permeability. The entire front-surface cushion section 62 is not closed by the head. Therefore, high sound quality is obtained. It is desirable that a portion formed of the material having the high sound permeability in the front-surface cushion section 62 is provided over a region wider than a region of a projected section where the head is projected on the front-surface cushion section 62 side in front view. That is, it is desirable that the portion formed of the material having the high sound permeability in the front-surface cushion section 62 is provided to a range not hidden by the head in front view in a state in which the head is in contact with the headrest device 10.

Further, voice of the seated person is input to the acoustic microphone 51 through the front-surface cushion section 62 having the high sound permeability. Therefore, it is possible to suppress the voice from being damped by the front-surface cushion section 62. It is possible to correctly input the voice to the acoustic microphone 51.

Sound input to the headrest device 10 from the back and the side can be reduced by the rear-side cushion section 63. Therefore, the acoustic microphone 51 can correctly receive sound from the front.

As explained above, according to the first embodiment applied with the present invention, the sealed structure by the cushion core material 12 is adopted and the acoustic speakers 50, 50 are disposed in the cushion core material 12. Therefore, the cushion core material 12 can be used as the enclosure section 40 of the acoustic speakers 50, 50. Therefore, it is possible to provide the acoustic speakers 50, 50 in the headrest device 10 in a simple structure.

Since the acoustic speakers 50, 50 are formed narrow to the left and right and long in the up-down direction, it is possible to increase sound directivity in the up-down direction of the acoustic speakers 50, 50. Therefore, it is possible to provide high sound quality irrespective of the upper and lower positions of the headrest device 10 and the height position of a listener. It is possible to form the headrest device 10 compactly to the left and right.

It is possible to use one cushion core material 12 as the enclosure section 40 of the plurality of acoustic speakers 50, 50. It is possible to simplify the structure of the acoustic speakers 50, 50.

Further, the left and right acoustic speakers 50, 50 are disposed outward in the left-right direction. The sound S1 spreads to the outer side on the left and right. Therefore, even in a configuration in which the headrest device 10 is made compact to the left and right, it is possible to obtain a satisfactory stereophonic sense.

The cushion core material 12 includes the sub-woofer 52. The sub-woofer 52 is disposed downward in the vertical direction of the cushion core material 12. Therefore, it is possible to mainly transmit sound of the sub-woofer 52 to a portion lower than the head of the seated person. It is possible to cause the seated person to easily feel a low tone.

The pair of stay sections 18, 18 to the seat is coupled to the cushion core material 12. Therefore, it is possible to improve supporting rigidity of the cushion core material 12 using the stay sections 18, 18.

The main frames 15, 15 functioning as low tone ducts may be coupled to the hollow section of the cushion core material 12.

In this case, since the main frames 15, 15 functioning as the low tone duct are coupled to the hollow section of the cushion core material 12, it is possible to obtain a desired speaker characteristic by adjusting setting of a size and the like of the low tone ducts.

Further, the acoustic-device attachment surface 41 functioning as the shock resistant surface is formed in the cushion core material 12. Openings are formed in the speaker housing recesses 59, 59 of the acoustic-device attachment surface 41. The acoustic speakers 50, 50 are disposed on the inner side of the openings. The acoustic speakers 50, 50 are disposed in a form adapted to a test performed using a head form provided for in details of a safety standard for a road transport vehicle. Therefore, it is possible to provide the acoustic speakers 50, 50 in the headrest device 10 in a simple structure. Further, it is possible to satisfy the safety standard.

According to the first embodiment applied with the present invention, the acoustic-device attachment surface 41 functioning as the shock resistant surface is formed in the cushion core material 12, the sound collection opening section 61a is formed in the acoustic-device attachment surface 41, and the acoustic microphone 51 is disposed on the inner side of the sound collection opening section 61a. Consequently, it is possible to efficiently collect sound with the acoustic microphone 51 via the sound collection opening section 61a. Further, since the acoustic microphone 51 is disposed on the inner side of the sound collection opening section 61a, it is possible to prevent the head from strongly coming into contact with the acoustic microphone 51 to cause a large shock. It is possible to satisfy a standard of a shock.

The acoustic microphone 51 is disposed in the form adapted to the test performed using the head form provided for in details of the safety standard for a road transport vehicle. Therefore, it is possible to efficiently collect sound with the acoustic microphone 51 via the sound collection opening section 61a. Further, it is possible to satisfy a predetermined safety standard.

The sound collecting section 61 is provided between the sound collection opening section 61a of the cushion core material 12 and the acoustic microphone 51. Therefore, it is possible to efficiently collect sound in the acoustic microphone 51 with the sound collecting section 61.

Since the sound collecting mechanism is configured by the substantially conical sound collecting section 61, it is possible to efficiently collect sound in the acoustic microphone 51.

Further, since the sound collection opening section 61a is formed on the front surface of the cushion core material 12, it is possible to efficiently collect sound from the front in the acoustic microphone 51.

The plurality of acoustic speakers 50, 50 are disposed around the acoustic microphone 51. The acoustic speakers 50, 50 are disposed outward with respect to the acoustic microphone 51. Therefore, it is possible to suppress the sound S1 of the acoustic speakers 50, 50 from being collected in the acoustic microphone 51.

The front of the acoustic microphone 51 is covered with the front-surface cushion section 62 formed of a material that allows sound to easily pass. Therefore, it is possible to efficiently collect sound in the acoustic microphone 51.

According to the first embodiment applied with the present invention, the acoustic speakers 50, 50 are disposed in the cushion core material 12, the front surface 12a, which is a part of the surface of the cushion core material 12, is covered with the front-surface cushion section 62 formed of the material that allows sound to easily pass, and the remaining surfaces are covered with the two layers of the damping layer 63a formed of a material that damps sound and the sound blocking layer 63b, which is the material having a high vibration damping property and a high sound blocking property. Consequently, it is possible to output sound from the front surface 12a of the cushion core material 12 through the front-surface cushion section 62. It is possible to reduce sound output from the remaining surfaces in the two layers of the damping layer 63a and the sound blocking layer 63b. Therefore, it is possible to output, according to a purpose of use, sound in a direction that the front surface 12a of the cushion core material 12 faces.

Since the damping layer 63a is the inner layer and the sound blocking layer 63b is the outer layer, sound damped by the damping layer 63a can be blocked by the sound blocking layer 63b. It is possible to efficiently reduce the sound output from the remaining surfaces.

Since the damping layer 63a and the sound blocking layer 63b adhere, a movement of the damping layer 63a can be regulated by the sound blocking layer 63b. It is possible to improve a damping property of vibration (sound) of the sound blocking layer 63b.

Further, the part of the surface is a substantially entire region of the cushion core material 12. Therefore, it is possible to output sound forward without leaking the sound in other directions. It is possible to provide the seated person with a personal acoustic space.

Since the material that allows sound to easily pass is the fiber pad, it is possible to allow sound output from the front surface 12a to smoothly pass. Further, it is possible to obtain a satisfactory cushion property on the front surface 12a side.

Further, since the damping layer 63a is a urethane-based material, it is possible to effectively damp the sound output from the remaining surfaces.

Since the sound blocking layer 63b is an elastomer-based material, it is possible to effectively damp and block the sound output from the remaining surfaces.

Note that the first embodiment indicates a form applied with the present invention. The present invention is not limited to the first embodiment.

In the first embodiment, the headrest device 10 is explained as being provided separately and detachably from the seat back section of the seat. However, the present invention is not limited to this. For example, the headrest device 10 may be integrally provided in the seat back section.

In the first embodiment, the vibration plate of the sub-woofer 52 is explained as being driven by the driving section. However, the present invention is not limited to this. The sub-woofer 52 may be, for example, a passive radiator that does not include the driving section and resonates with the acoustic speakers 50, 50 or the like to output sound.

In the first embodiment, the front surface 12a, which is the part of the surface of the cushion core material 12, is explained as being covered with the front-surface cushion section 62 formed of the material that allows sound to easily pass and the remaining surfaces are explained as being covered with the two layers of the damping layer 63a and the sound blocking layer 63b. However, the present invention is not limited to this. For example, as the part of the surface, at least one of the right side surface 12e and the left side surface 12f of the cushion core material 12 may be covered with the material that allows sound to easily pass. Acoustic speakers may be provided to be capable of outputting sound to the sides. The remaining surfaces of the cushion core material 12 may be covered with two layers of a damping layer and a sound blocking layer. In this case, for example, when it is sensed on the basis of a situation around a vehicle that a vehicle, a pedestrian, or the like is present on a side, it is possible to output sound from a corresponding side surface in the headrest device and inform the presence of the vehicle or the like. As the part of the surface, the top surface 12c of the cushion core material 12 may be covered with the material that allows sound to easily pass. Acoustic speakers may be provided to be capable of outputting sound upward. The remaining surfaces of the cushion core material 12 may be covered with the two layers of the damping layer and the sound blocking layer.

Second Embodiment

A second embodiment applied with the present invention is explained with reference to FIG. 8 to FIG. 10. In the second embodiment, portions configured the same as the portions in the first embodiment are denoted by the same reference numerals and signs and explanation of the portions is omitted.

The second embodiment is different from the first embodiment in that a plurality of acoustic microphones 251, 251 are provided as a left and right pair or left and right pairs instead of the acoustic microphone 51 in the first embodiment.

Figure 8:
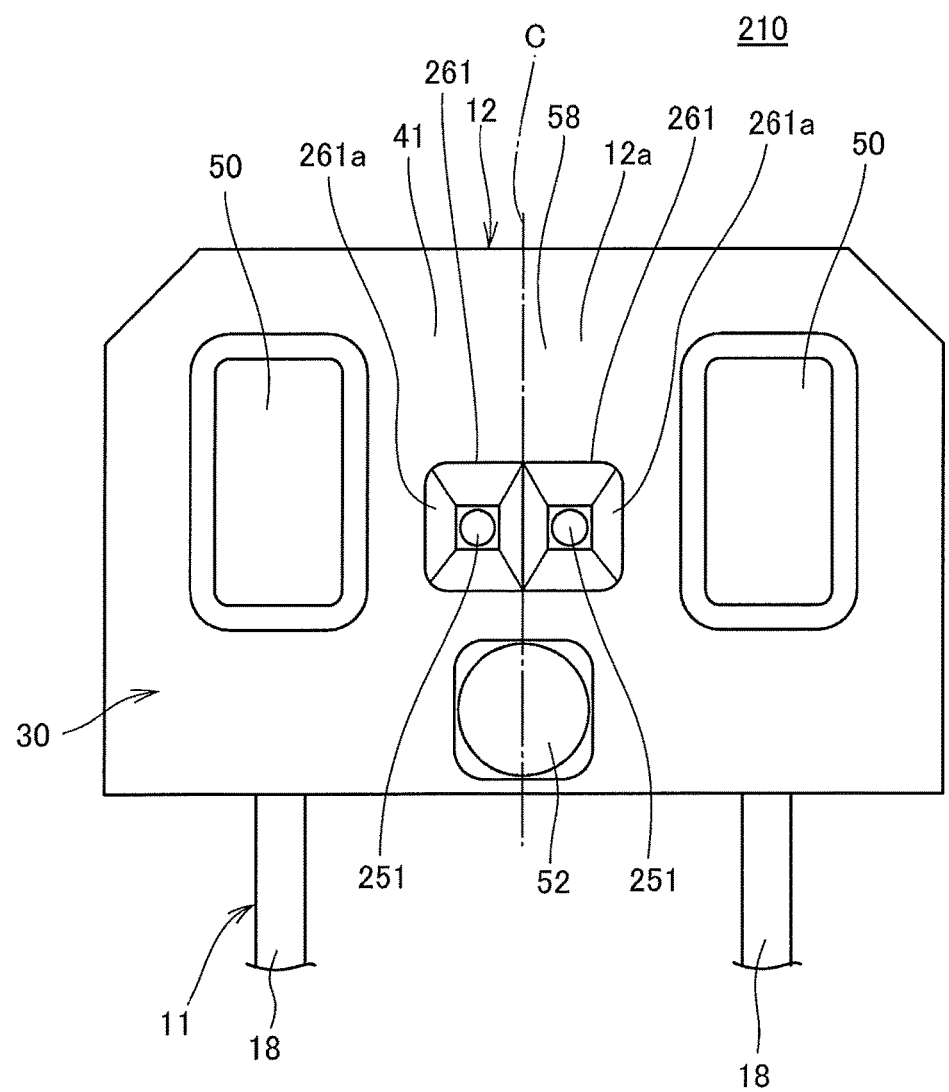
FIG. 8 is a front view of a headrest device in a second embodiment.

FIG. 8 is a front view of a headrest device 210 in the second embodiment. In FIG. 8, illustration of the cushion 13 is omitted.

The headrest device 210 includes the frame 11, the cushion core material 12, the acoustic speakers 50, 50, the sub-woofer 52, and the pair of left and right acoustic microphones 251, 251.

The acoustic microphones 251, 251 are linearly disposed side by side as a pair in the lateral direction (the lateral width direction of the headrest device 210). The acoustic microphones 251, 251 are disposed with a predetermined space apart from each other. The acoustic microphones 251, 251 are disposed to be substantially equally distributed on the left and right with respect to a center line C in the lateral width direction of the headrest device 210.

The acoustic microphones 251, 251 are non-contact type acoustic microphones that receive a sound wave propagating in the air with vibration plates and convert the sound wave into an electric signal. On the other hand, the bone conduction-type microphone explained as the conventional example in the first embodiment is a contact type acoustic microphone that is in contact with an object serving as a sound source and collects sound.

The acoustic-device attachment surface 41 of the cushion core material 12 includes a pair of left and right hole-like sound collecting sections 261, 261 recessed toward the inner side of the enclosure section 40. In the sound collecting sections 261, 261, the acoustic microphones 251, 251 are respectively housed. The sound collecting sections 261, 261 are disposed in the center portion in the width direction of the headrest device 10 between the acoustic speakers 50, 50, disposed in the center portion in the up-down direction of the headrest device 10 above the sub-woofer 52, and located behind the back of the head H of the seated person. The sound collecting sections 261, 261 are formed in a substantially conical shape tapered toward the rear end side. An axis (not shown in the figure) of the substantially conical shape of the sound collecting sections 261, 261 extends forward substantially horizontally. Sound collection opening sections 261a, 261a for capturing sound into the sound collecting sections 261, 261 are formed on the front surfaces of the sound collecting sections 261, 261. Note that the sound collecting sections 261, 261 only have to be formed in a shape capable of collecting sound and are not limited to the substantially conical shape. The sound collecting sections 261, 261 may be formed in a shape such as a substantially pyramid shape or a substantially conical trapezoidal shape.

Figure 9:
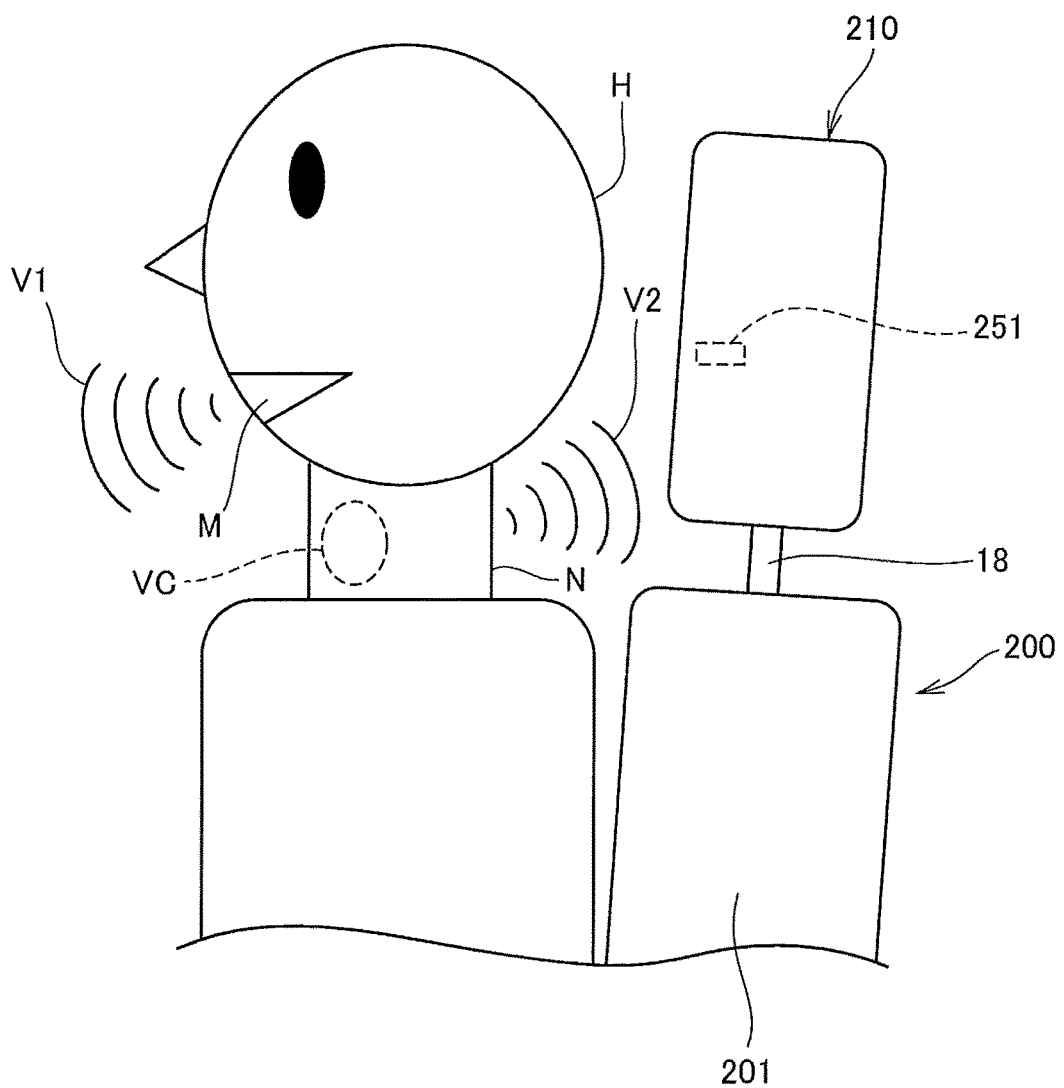
FIG. 9 is a schematic view showing a state in which voice of a seated person seated in a seat is collected by an acoustic microphone.

FIG. 9 is a schematic diagram showing a state in which voice of a seated person seated on a seat 200 is collected by the acoustic microphones 251, 251.

The seated person is seated with the back leaned against a seat back section 201 of the seat 200. The stay sections 18, 18 are inserted into attachment hole sections (not shown in the figure) of the upper surface of the seat back section 201, whereby the headrest device 210 is fixed to the seat back section 201. The headrest device 210 is configured to be capable of changing a height position of attachment according to a physique or the like of the seated person by adjusting insertion depth of the stay sections 18, 18 into the attachment holes.

When the seated person emits voice, the voice is output forward from a mouth M as voice V1 and is also output from a neck N including a vocal cord VC. Voice V2, which is a part of the voice output from the neck N, is emitted to the back and collected by the acoustic microphones 251, 251.

Conventionally, when voice of the seated person is collected by the non-contact type sound collection microphone, in order to efficiently collect voice output from the mouth of the seated person, in general, the sound collection microphone is provided in front of the seated person. However, when the sound collection microphone is disposed in front of the seated person, in a vehicle, there is a problem in that an airbag obstructs the disposition of the sound collection microphone or noise of sound collection increases because the sound collection microphone is disposed in the position of a dashboard or the like separated from the seated person.

The inventors of this application found that the voice V2 output backward from the back of the head H or the neck N of the seated person has sufficient magnitude for collection in the sound collection microphone and obtained a conspicuous effect that sound can be efficiently collected by providing the non-contact type acoustic microphones 251, 251 in the headrest device 210.

Since the acoustic microphones 251, 251 are the non-contact type, by adjusting the shape of the sound collecting sections 261, 261 according to necessity, it is possible to change a sound collection characteristic of the acoustic microphones 251, 251 to a characteristic for allowing voice of the seated person to be easily collected. That is, by changing the depth of recesses and the shape of slopes of the sound collecting sections 261, 261, an angle of axes of the sound collecting sections 261, 261, and the like, it is possible to change a sound collection characteristic of the sound collecting sections 261, 261 to a characteristic having directivity for enabling voice to be efficiently collected from the back of the head H and the neck N. Such directivity cannot be obtained by a contact type acoustic microphone.

The upper and lower positions of the headrest device 210 are adjusted to be adapted to the physique of the seated person. Therefore, the positions of the acoustic microphones 251, 251 are also automatically located in positions suitable for the seated person. Therefore, it is possible to efficiently collect sound in the acoustic microphones 251, 251 irrespective of the physique of the seated person.

Figure 10:
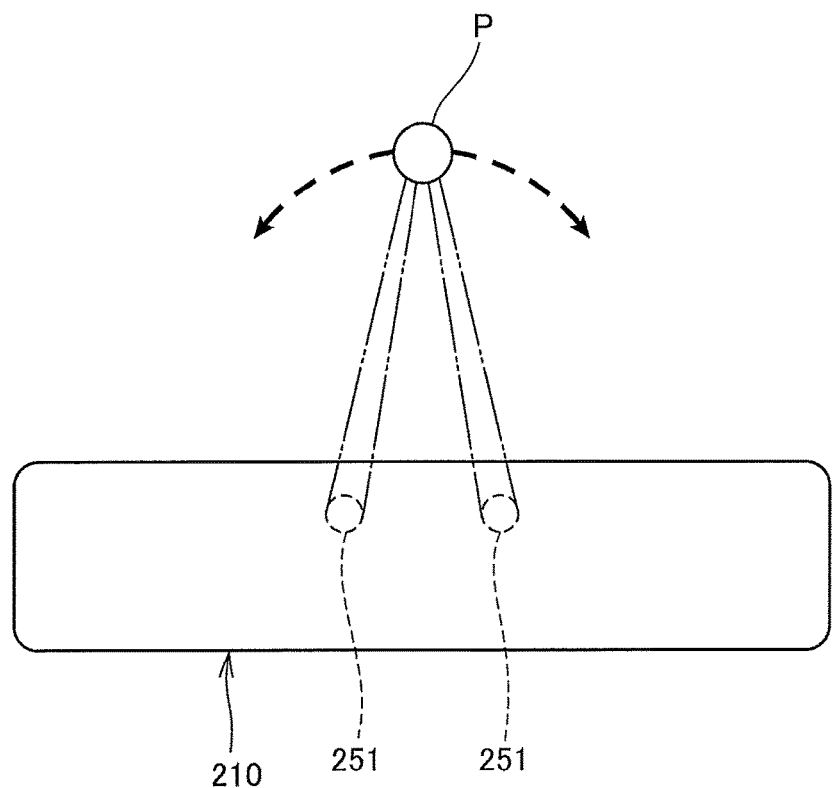
FIG. 10 is a top view showing directivity in the lateral direction of the acoustic microphone.

FIG. 10 is a top view showing directivity in the lateral direction of the acoustic microphones 251, 251.

The acoustic microphones 251, 251 are disposed side by side in the lateral direction. Therefore, the acoustic microphones 251, 251 have a sound collection characteristic having directivity in the lateral direction. As shown in FIG. 10, a sound collection point P can be changed in the lateral direction in a fixed range.

The sound collection characteristic is obtained by, for example, the control section 53 detecting a direction of voice from a shift of respective times when the voice reaches the acoustic microphones 251, 251 and performing processing for emphasizing the voice in a specific direction. The acoustic microphones 251, 251 are so-called beam forming microphones. The sound collection point P of the acoustic microphones 251, 251 is set according to, for example, positions of vocal cords VC of seated persons.

By disposing the acoustic microphones 251, 251 side by side in the lateral direction in this way, it is possible to set the sound collection point P according to the position of the vocal cord VC or the like that is different depending on the seated person. It is possible to efficiently collect voice of the seated person.

Since the acoustic microphones 251, 251 are disposed side by side in the lateral direction, according to the sound collection characteristic in the lateral direction, it is possible to reduce noise arriving from a glass side on the side of the seated person, from an occupant beside the seated person, and from the outer side of the vehicle. It is possible to efficiently collect voice of the seated person.

The acoustic microphones 251, 251 and the sound collecting sections 261, 261 are formed to satisfy the safety standard explained in the first embodiment.

Third Embodiment

A third embodiment applied with the present invention is explained below with reference to FIG. 11 and FIG. 12. In the third embodiment, portions configured the same as the portions in the first embodiment are denoted by the same reference numerals and signs and explanation of the portions is omitted.

The third embodiment is different from the first embodiment in that a plurality of acoustic microphones 351, 351 are provided as an upper and lower pair instead of the acoustic microphone 51 in the first embodiment.

Figure 11:
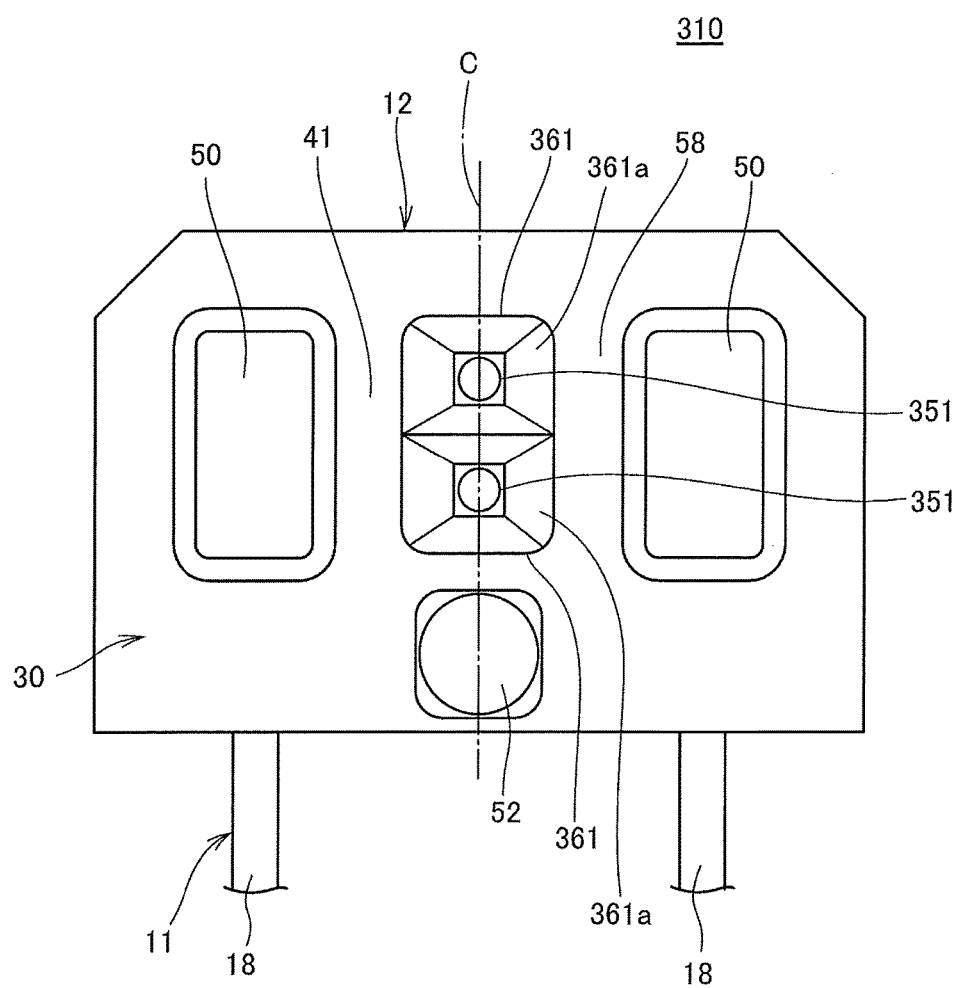
FIG. 11 is a front view of a headrest device in a third embodiment.

FIG. 11 is a front view of a headrest device 310 in the third embodiment. In FIG. 11, illustration of the cushion 13 is omitted.

The headrest device 310 includes the frame 11, the cushion core material 12, the acoustic speakers 50, 50, the sub-woofer 52, and the pair of left and right acoustic microphones 351, 351.

The acoustic microphones 351, 351 are linearly disposed side by side as a pair in the longitudinal direction (the up-down direction of the headrest device 310). The acoustic microphones 351, 351 are disposed a predetermined space apart from each other. The acoustic microphones 351, 351 are disposed in positions substantially coinciding with a center line C in the lateral width direction of the headrest device 310.

The acoustic microphones 351, 351 are non-contact type acoustic microphones that receive a sound wave propagating in the air with vibration plates and convert the sound wave into an electric signal.

The acoustic-device attachment surface 41 of the cushion core material 12 includes a pair of left and right hole-like sound collecting sections 361, 361 recessed toward the inner side of the enclosure section 40. In the sound collecting sections 361, 361, the acoustic microphones 351, 351 are respectively housed. The sound collecting sections 361, 361 are disposed in the center portion in the width direction of the headrest device 10 between the acoustic speakers 50, 50, disposed in the center portion in the left-right direction of the headrest device 10 above the sub-woofer 52, and located behind the back of the head H of the seated person. The sound collecting sections 361, 361 are formed in a substantially conical shape tapered toward the rear end side. An axis (not shown in the figure) of the substantially conical shape of the sound collecting sections 361, 361 extends forward substantially horizontally. Sound collection opening sections 361a, 361a for capturing sound into the sound collecting sections 361, 361 are formed on the front surfaces of the sound collecting sections 361, 361. Note that the sound collecting sections 361, 361 only have to be formed in a shape capable of collecting sound and are not limited to the substantially conical shape. The sound collecting sections 361, 361 may be formed in a shape such as a substantially pyramid shape or a substantially conical trapezoidal shape.

The headrest device 310 is attached to the seat back section 201 instead of the headrest device 210 in FIG. 9.

According to the third embodiment, since the acoustic microphones 351, 351 are provided in the headrest device 310, it is possible to collect the voice V2 output backward from the back of the head H or the neck N of the seated person. It is possible to efficiently collect voice of the seated person.

Since the acoustic microphones 351, 351 are the non-contact type, by adjusting the shape of the sound collecting sections 361, 361 according to necessity, it is possible to change a sound collection characteristic of the acoustic microphones 351, 351 to a characteristic for allowing voice of the seated person to be easily collected. That is, by changing the depth of recesses and the shape of slopes of the sound collecting sections 361, 361, an angle of axes of the sound collecting sections 361, 361, and the like, it is possible to change a sound collection characteristic of the sound collecting sections 361, 361 to a characteristic having directivity for enabling voice to be efficiently collected from the back of the head H and the neck N.

Figure 12:
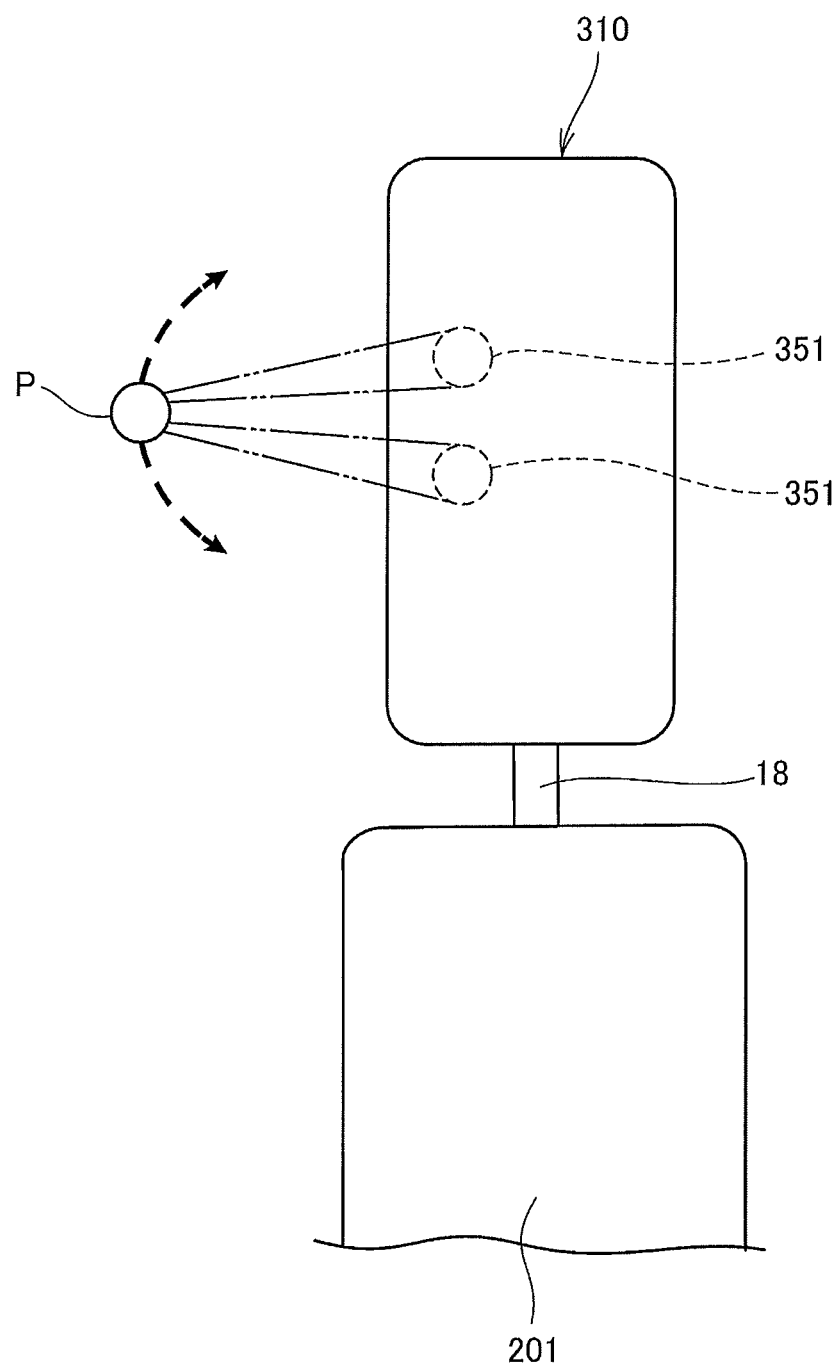
FIG. 12 is a top view showing directivity in the longitudinal direction of the acoustic microphone.

FIG. 12 is a top view showing directivity in the longitudinal direction of the acoustic microphones 351, 351.

The acoustic microphones 351, 351 are disposed side by side in the longitudinal direction (the up-down direction). Therefore, the acoustic microphones 351, 351 have a sound collection characteristic having directivity in the longitudinal direction. As shown in FIG. 12, the sound collection point P can be changed in the lateral direction in a fixed range.

The sound collection characteristic is obtained by, for example, the control section 53 detecting a direction of voice from a shift of respective times when the voice reaches the acoustic microphones 351, 351 and performing processing for emphasizing the voice in a specific direction.

By disposing the acoustic microphones 351, 351 side by side in the longitudinal direction in this way, it is possible to set the sound collection point P according to the position of the vocal cord VC or the like that is different depending on the seated person. It is possible to efficiently collect voice of the seated person. That is, for example, even in a structure in which the vertical height of the headrest device 310 cannot be changed, it is possible to efficiently collect voice of the seated person by vertically adjusting the sound collection point P. In a configuration in which the vertical height of the headrest device 310 can be changed, it is possible to secure a larger vertical adjustment width of the sound collection point P.

The acoustic microphones 351, 351 and the sound collecting sections 361, 361 are formed to satisfy the safety standard explained in the first embodiment.

[Modification]

A modification of the third embodiment applied with the present invention is explained with reference to FIG. 13. In this modification, portions configured the same as the portions in the third embodiment are denoted by the same reference numerals and signs and explanation of the portions is omitted.

This modification is different from the third embodiment in that a headrest device includes application microphones 371, 371.

Figure 13:
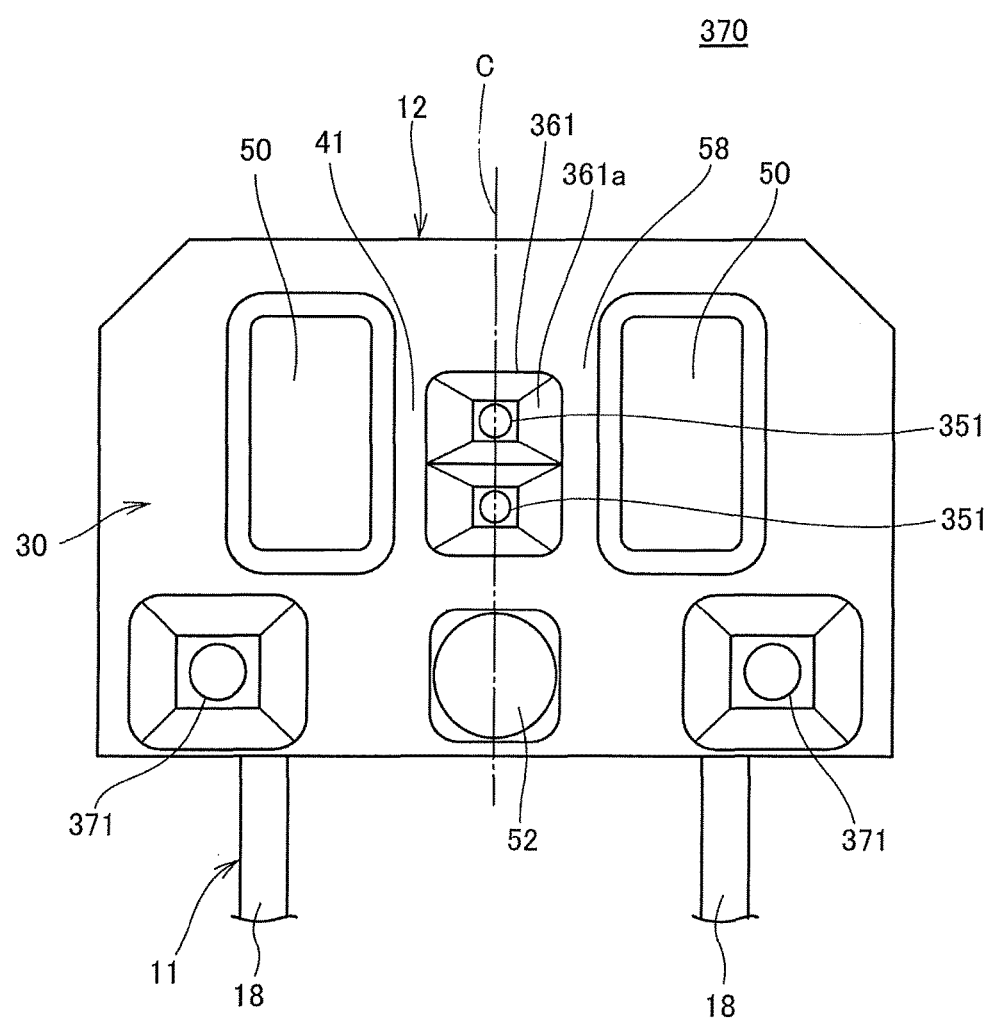
FIG. 13 is a front view of a headrest device showing a modification of the third embodiment.

FIG. 13 is a front view of a headrest device 370 showing the modification of the third embodiment.

The headrest device 370 includes an active noise cancelling function for outputting sound having an opposite phase of a phase of sound collected by microphones and cancelling the sound to reduce noise and a motion feedback function for correcting distortion of sound of speakers to be small on the basis of sound collected by the microphones.

The application microphones 371, 371 are provided as a left and right pair in left and right sides below the headrest device 370. The application microphones 371, 371 are respectively disposed on the left and right of the sub-woofer 52 below the acoustic-device attachment surface 41. The application microphones 371, 371 are disposed on the outer side of the acoustic speakers 50, 50 below the acoustic speakers 50, 50.

The control section 53 drives the acoustic speakers 50, 50 and the sub-woofer 52 on the basis of sound collected from the application microphones 371, 371 and executes the active noise cancelling function and the motion feedback function.

In this modification, the application microphones 371, 371 are provided in positions close to the ears of the seated person in the sides of the front surface of the headrest device 370. Since noise in the vicinities of the ears can be cancelled, it is possible to efficiently cancel noise. Since the application microphones 371, 371 are provided in the vicinities of the acoustic speakers 50, 50, it is possible to accurately collect distortion of sounds of the acoustic speakers 50, 50. It is possible to effectively execute the motion feedback function.

That is, it is possible to effectively collect voice of the seated person by providing the acoustic microphones 351, 351 in the center in the width direction of the headrest device 370. By providing the application microphones 371, 371 in the sides in the width direction of the headrest device 370, it is possible to effectively exhibit the active noise cancelling function and the motion feedback function.

Fourth Embodiment

A fourth embodiment applied with the present invention is explained below with reference to FIG. 14 to FIG. 16.

Figure 14:
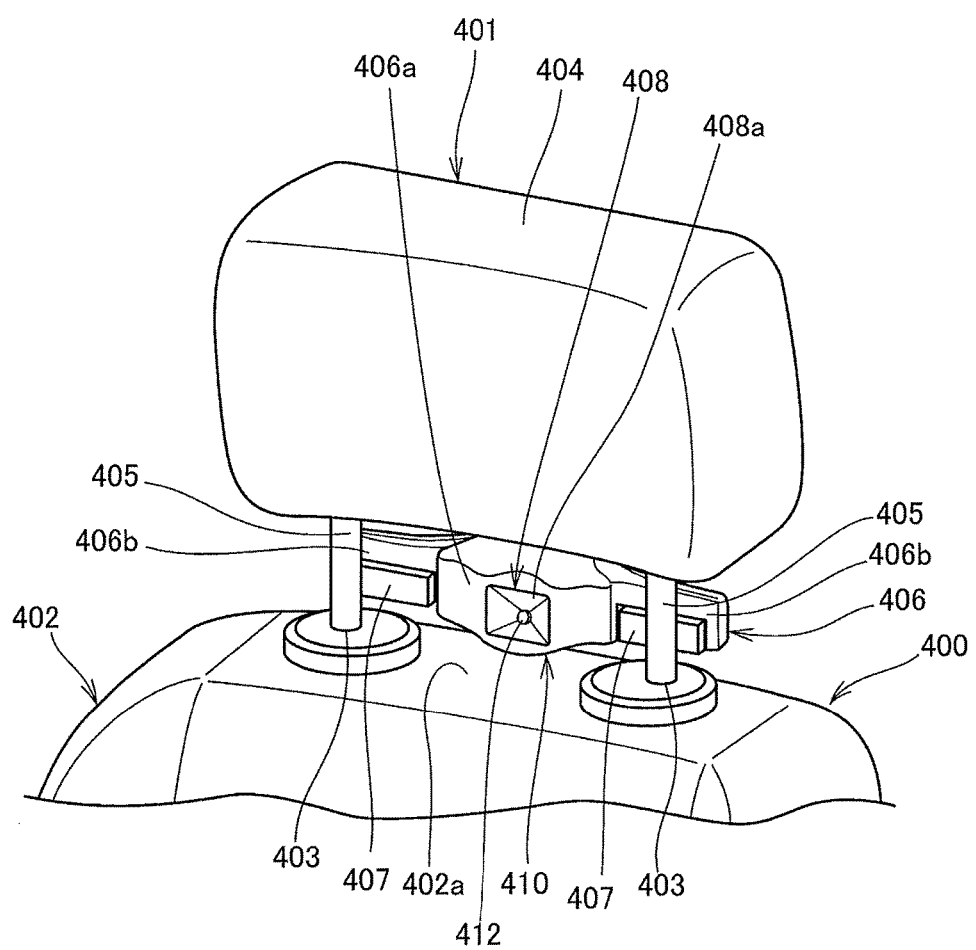
FIG. 14 is a perspective view showing a state in which a sound collecting device according to a fourth embodiment of the present invention is attached to a headrest.

FIG. 14 is a perspective view showing a state in which a sound collecting device 410 according to the fourth embodiment of the present invention is attached to a headrest 401. FIG. 15 is a schematic diagram showing a state in which voice of a seated person seated in a seat 400 is collected by the sound collecting device 410. FIG. 16 is a perspective view of the sound collecting device 410 viewed from the front side.

The sound collecting device 410 is provided in a seat for an occupant disposed in a vehicle interior. Examples of the vehicle interior include vehicle interiors of an automobile, a train, an airplane, and a ship. In the fourth embodiment, the sound collecting device 410 attached to a front seat of an automobile, that is, the seat 400 in which a driver is seated is explained as an example.

The seat 400 includes a seat surface section (not shown in the figure) on which a driver (a seated person) is seated, a seat back section 402 extending upward in a posture slightly inclining backward from the rear end of the seat surface section, and the headrest 401 attached to the upper end of the seat back section 402.

The sound collecting device 410 includes a communication section (not shown in the figure) that enables the sound collecting device 410 to cooperate with other devices (not shown in the figure) such as a portable terminal through short-range radio communication. Examples of the other devices include a cellular phone, a smart phone, and a tablet terminal. Examples of the short-range radio communication include Bluetooth (a short-range radio communication standard: registered trademark). Note that the headrest device 10 and the other devices can be connected by not only the short-range radio communication but also, for example, a wire.

In a state in which the sound collecting device 410 cooperates with the other devices, the seated person can operate the other devices using, as a voice command, voice collected by the sound collecting device 410 and make a call in a hand-free manner via the sound collecting device 410.

The seat back section 402 includes, in an upper surface 402a, a pair of left and right headrest connection hole sections 403, 403 to which the headrest 401 is connected.

The headrest 401 includes a block-like headrest cushion 404 that receives the head of the seated person and a pair of left and right headrest stays 405, 405 extending downward from the lower surface of the headrest cushion 404. The headrest stays 405, 405 are, for example, pipe materials made of metal such as iron.

The headrest stays 405, 405 are disposed in the vicinities of the left and right ends on the lower surface of the headrest cushion 404 and extend downward substantially in parallel in a state in which the headrest stays 405, 405 are spaced apart from each other in the left-right direction by a predetermined distance.

The headrest stays 405, 405 are inserted into the headrest connection hole sections 403, 403 from above, whereby the headrest 401 is connected to the seat back section 402. The seated person can adjust the upper and lower positions of the headrest 401 according to a physique, preference, or the like by sliding the headrest 401 up and down and engaging the headrest stays 405, 405 with engaging sections (not shown in the figure) of the headrest connection hole sections 403, 403 in any positions.

The sound collecting device 410 includes a block-like attachment section 411 attached to the headrest stays 405, 405 and a non-contact type acoustic microphone 412 provided in the attachment section 411.

The attachment section 411 includes a housing 406 provided across the left and right headrest stays 405, 405 and magnets 407, 407 functioning as a pair of left and right fixing sections provided in the housing 406.

The housing 406 is formed longer in the left-right direction than in the up-down direction. The housing 406 includes a center portion 406a where the acoustic microphone 412 is provided and side portions 406b, 406b respectively extending in the left and right side directions from the center portion 406a.

The front surface of the center portion 406a of the housing 406 swells further to the seated person side (the front side) than the front surfaces of the side portions 406b, 406b. A hole-like sound collecting section 408 recessed to the rear side is formed on the front surface of the center portion 406a. The sound collecting section 408 is formed in a substantially conical shape tapered toward the rear end side. A sound collection opening section 408a for capturing sound into the sound collecting section 408 is formed on the front surface of the sound collecting section 408. The acoustic microphone 412 is disposed in the sound collecting section 408. Note that the sound collecting section 408 only has to be formed in a shape capable of collecting sound and is not limited to the substantially conical shape. The sound collecting section 408 only has to be recessed in the substantially conical/pyramid shape and may be formed in a shape such as a substantially pyramid shape or a substantially conical trapezoidal shape.

The acoustic microphone 412 is a non-contact type acoustic microphone that receives a sound wave propagating in the air with a vibration plate and converts the sound wave into an electric signal. On the other hand, the bone conduction-type microphone explained as the conventional example in the first embodiment is a contact type acoustic microphone that is in contact with an object serving as a sound source and collects sound.

Magnets 407, 407 are provided to be exposed forward on the front surfaces of the side portions 406b, 406b of the housing 406. The magnets 407, 407 are disposed in positions overlapping the headrest stays 405, 405 in front view of the headrest 401.

The sound collecting device 410 is set in the headrest stays 405, 405 from the rear side of the headrest 401. The front surfaces of the magnets 407, 407 are attracted to the rear surfaces of the headrest stays 405, 405 by a magnetic force, whereby the sound collecting device 410 is attached to the headrest stays 405, 405.

In a state in which the sound collecting device 410 is attached to the headrest stays 405, 405, the sound collecting device 410 is located in the center portion between the left and right headrest stays 405, 405 and located between the lower surface of the headrest cushion 404 and the upper surface 402a of the seat back section 402 in the up-down direction.

Figure 15:
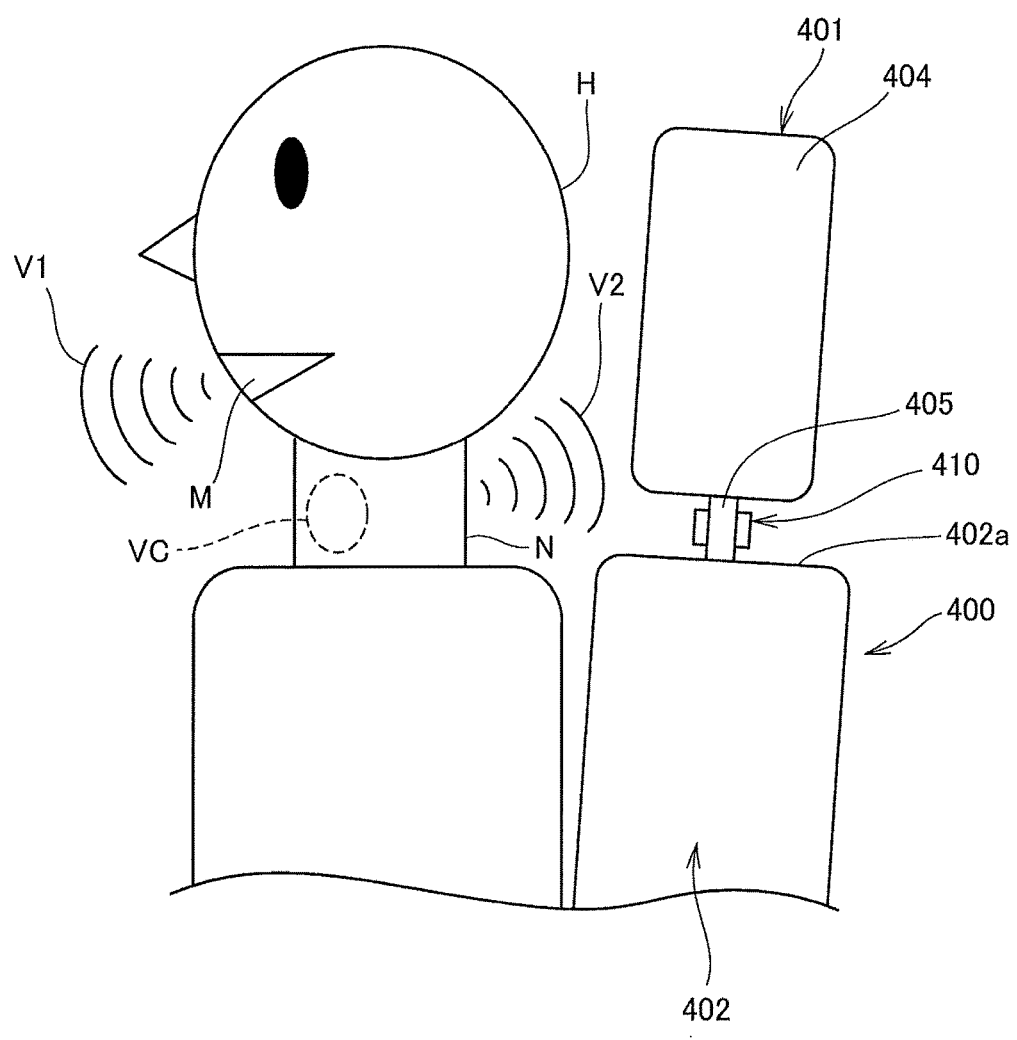
FIG. 15 is a schematic diagram showing a state in which voice of a seated person seated in a seat is collected by a sound collecting device.
Figure 16:
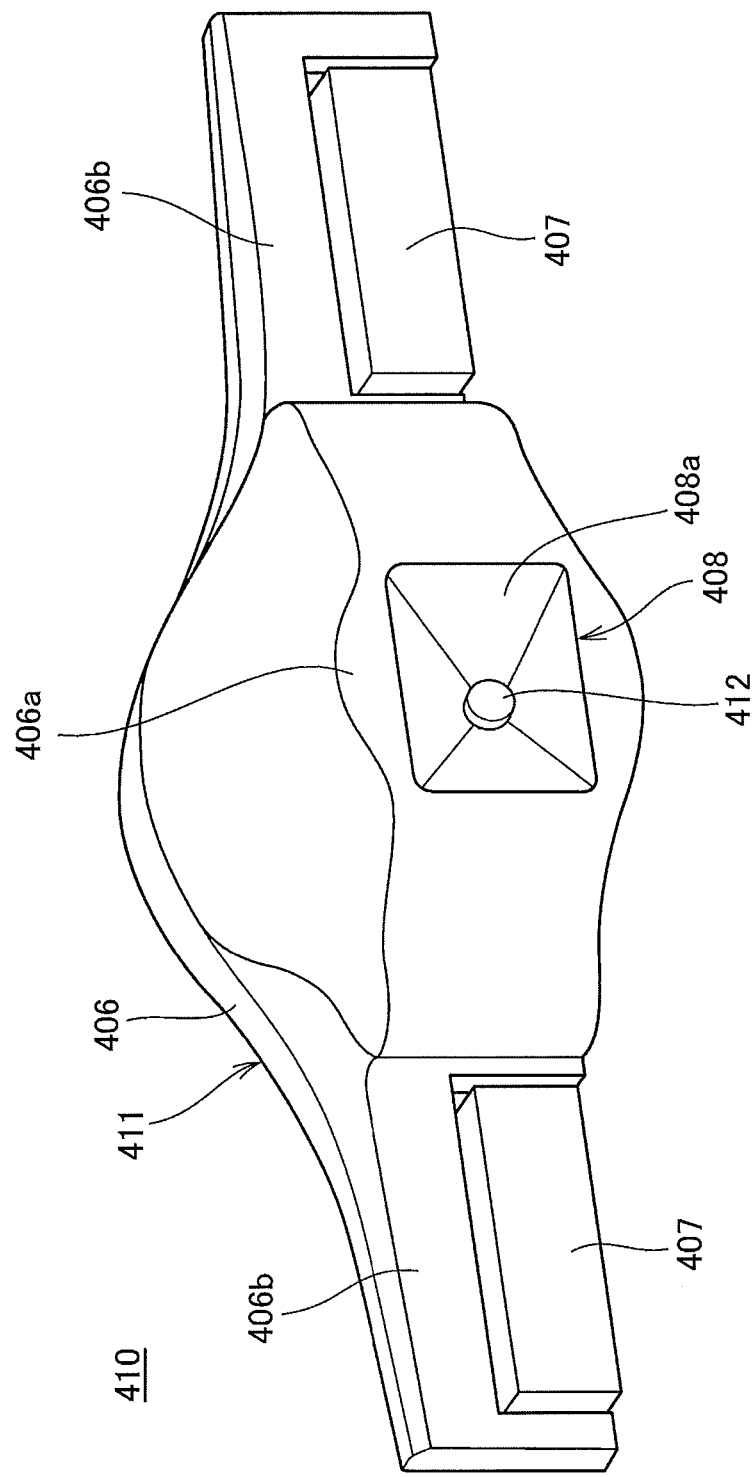
FIG. 16 is a perspective view of the sound collecting device viewed from the front side.

As shown in FIG. 15, when the seated person emits voice, the voice is output forward from the mouth M as the voice V1 and also output from the neck N including the vocal cord VC. The voice V2 serving as a part of sound output from the neck N is emitted backward and collected by the acoustic microphone 412.

According to the fourth embodiment, since the acoustic microphone 412 is provided between the headrest stays 405, 405, it is possible to collect the voice V2 output backward from the back of the head H and the neck N of the seated person. It is possible to efficiently collect voice of the seated person.

Since the acoustic microphone 412 is attached to the headrest stays 405, 405, it is possible to prevent the acoustic microphone 412 from obstructing the disposition of an airbag in front of an occupant. Since the acoustic microphone 412 is close to the back of the head H and the neck N, it is possible to reduce noise that occurs because an acoustic microphone is present in a distant position from the seated person.

Since the acoustic microphone 412 is the non-contact type, by adjusting the shape of the sound collecting section 408 according to necessity, it is possible to change a sound collection characteristic of the acoustic microphone 412 to a characteristic for allowing voice of the seated person to be easily collected. That is, by changing the depth of recesses and the shape of slopes of the sound collecting section 408, an angle of an axis of the conical/pyramid shape of the sound collecting section 408, and the like, it is possible to change a sound collection characteristic of the sound collecting section 408 to a characteristic having directivity for enabling voice to be efficiently collected from the back of the head H and the neck N.

Further, since the sound collecting device 410 is attached to the rear surface side of the headrest stays 405, 405, even if acceleration of deceleration acts on a car or the like in which the seat 400 is set, the seat 400 cannot move to the seated person side passing between the headrest stays 405, 405. Therefore, even when the acceleration of deceleration occurs, it is possible to prevent the sound collecting device 410 from obstructing the seated person.

As explained above, according to the fourth embodiment applied with the present invention, the sound collecting device 410 includes the attachment section 411 attached to the headrest stays 405, 405, which connect the headrest 401 of the seat 400 to the seat back section 402, and the non-contact type acoustic microphone 412 supported by the attachment section 411. Therefore, by attaching the sound collecting device 410 to the headrest stays 405, 405 of the seat 400 via the attachment section 411, it is possible to collect voice output from the back of the head H and the neck N of the seated person with the acoustic microphone 412 in a non-contact manner. It is possible to efficiently collect voice of the seated person.

Further, the attachment section 411 includes the sound collecting section 408 opened to the seated person side. The acoustic microphone 412 is disposed in the sound collecting section 408. Therefore, it is possible to efficiently collect voice of the seated person in the acoustic microphone 412 with the sound collecting section 408.

Since the sound collecting section 408 is formed in the substantially conical/pyramid shape, it is possible to efficiently collect sound.

The attachment section 411 is attached between the pair of headrest stays 405, 405. The acoustic microphone 412 is disposed in the intermediate portion between the headrest stays 405, 405. Therefore, it is possible to dispose the acoustic microphone 412 near the back of the head H and the neck N of the seated person. It is possible to efficiently collect voice of the seated person.

Further, the sound collecting device 410 is attached on the rear surface side of the headrest stays 405, 405 rather than the headrest cushion 404. Therefore, the sound collecting device 410 does not affect the standard of a shock explained in the first embodiment.

Fifth Embodiment

A fifth embodiment applied with the present invention is explained below with reference to FIG. 17. In the fifth embodiment, portions configured the same as the portions in the fourth embodiment are denoted by the same reference numerals and signs and explanation of the portions is omitted.

The fifth embodiment is different from the fourth embodiment in that a plurality of acoustic microphones 512, 512 are provided as a left and right pair instead of the acoustic microphone 412 in the fourth embodiment.

Figure 17:
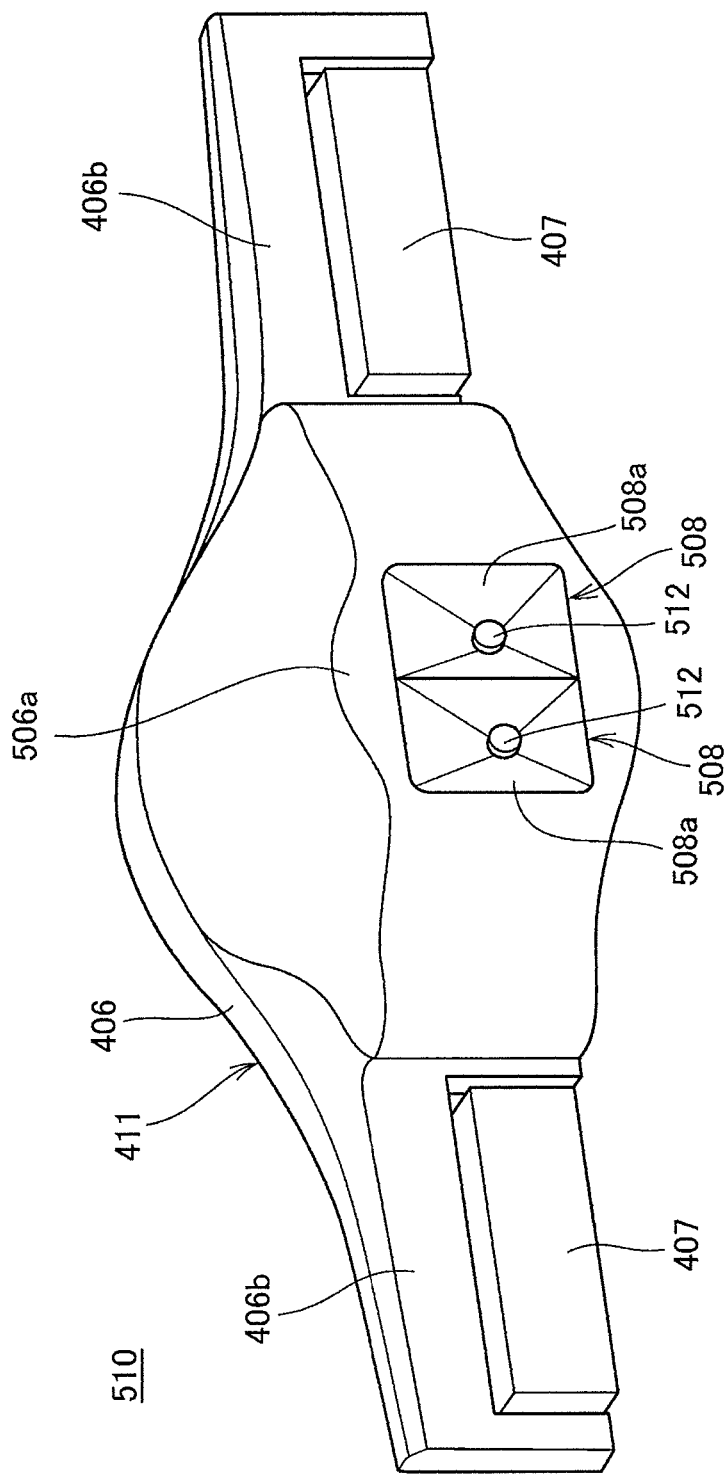
FIG. 17 is a perspective view of a sound collecting device in a fifth embodiment.

FIG. 17 is a perspective view of a sound collecting device 510 in the fifth embodiment.

The sound collecting device 510 includes the attachment section 411 and the acoustic microphones 512, 512. The housing 406 of the attachment section 411 includes a center portion 506a where the acoustic microphones 512, 512 are provided and side portions 406b, 406b respectively extending to the left and right side directions from the center portion 506a.

The pair of acoustic microphones 512, 512 is linearly disposed side by side in the lateral direction (the lateral width direction of the headrest 401). The acoustic microphones 512, 512 are disposed a predetermined space apart from each other. The acoustic microphones 512, 512 are disposed to be substantially equally distributed to the left and right with respect to a center line (not shown in the figure) in the lateral width direction of the headrest 401.

The acoustic microphones 512, 512 are non-contact type acoustic microphones that receive a sound wave propagating in the air with vibration plates and convert the sound wave into an electric signal.

The front surface of the center portion 506a of the housing 406 includes a pair of left and right hole-like sound collecting sections 508, 508 recessed to the rear side. The sound collecting sections 508, 508 are formed in a substantially conical/pyramid shape tapered toward the rear end side. Sound collection opening sections 508a, 508a for capturing sound into the sound collecting sections 508, 508 are formed on the front surfaces of the sound collecting sections 508, 508. The acoustic microphones 512, 512 are respectively housed in the sound collecting sections 508, 508.

In the fifth embodiment, the acoustic microphones 512, 512 are disposed side by side in the lateral direction. Therefore, the acoustic microphones 512, 512 have a sound collection characteristic having directivity in the lateral direction. The sound collection point P (see FIG. 10) can be changed in the lateral direction in a fixed range according to a principle same as the principle in the second embodiment.

Since the acoustic microphones 512, 512 are disposed side by side in the lateral direction in this way, it is possible to set the sound collection point P according to the position of the vocal cord VC or the like that is different depending on the seated person. It is possible to efficiently collect voice of the seated person.

Since the acoustic microphones 512, 512 are disposed side by side in the lateral direction, according to the sound collection characteristic in the lateral direction, it is possible to reduce noise arriving from a glass side on the side of the seated person, from an occupant beside the seated person, and from the outer side of the vehicle. It is possible to efficiently collect voice of the seated person.

Sixth Embodiment

A sixth embodiment applied with the present invention is explained below with reference to FIG. 18. In the sixth embodiment, portions configured the same as the portions in the fourth embodiment are denoted by the same reference numerals and signs and explanation of the portions is omitted.

The sixth embodiment is different from the fourth embodiment in that a plurality of acoustic microphones 612, 612 are provided as an upper and lower pair instead of the acoustic microphone 412 in the fourth embodiment.

Figure 18:
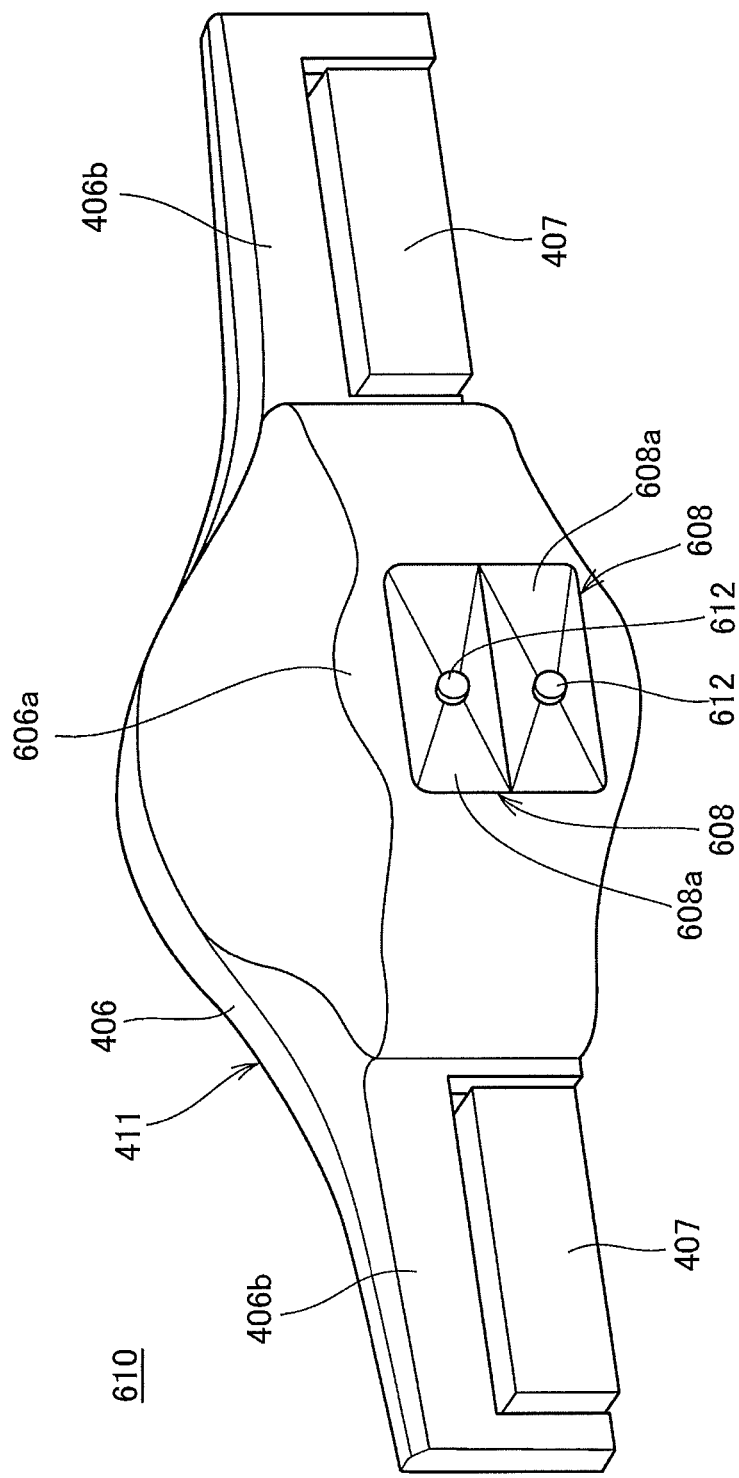
FIG. 18 is a perspective view of a sound collecting device in a sixth embodiment.

FIG. 18 is a perspective view of a sound collecting device 610 in the sixth embodiment.

The sound collecting device 610 includes the attachment section 411 and the acoustic microphones 612, 612. The housing 406 of the attachment section 411 includes a center portion 606a where the acoustic microphones 612, 612 are provided and side portions 406b, 406b respectively extending in the left and right side directions from the center portion 606a.

The pair of acoustic microphones 612, 612 is linearly disposed side by side in the longitudinal direction (the up-down direction of the headrest 401). The acoustic microphones 612, 612 are disposed a predetermined space apart from each other. The acoustic microphones 612, 612 are disposed in positions substantially coinciding with a center line (not shown in the figure) in the lateral width direction of the headrest 401.

The acoustic microphones 512, 512 are non-contact type acoustic microphones that receive a sound wave propagating in the air with vibration plates and convert the sound wave into an electric signal.

The front surface of the center portion 606a of the housing 406 includes a pair of upper and lower hole-like sound collecting sections 608, 608 recessed to the rear side. The sound collecting sections 608, 608 are formed in a substantially conical/pyramid shape tapered toward the rear end side. Sound collection opening sections 608a, 608a for capturing sound into the sound collecting sections 608, 608 are formed on the front surfaces of the sound collecting sections 608, 608. The acoustic microphones 612, 612 are respectively housed in the sound collecting sections 608, 608.

In the sixth embodiment, the acoustic microphones 612, 612 are disposed side by side in the longitudinal direction (the up-down direction). Therefore, the acoustic microphones 612, 612 have a sound collection characteristic having directivity in the longitudinal direction. The sound collection point P (see FIG. 12) can be changed in the longitudinal direction in a fixed range according to a principle same as the principle in the third embodiment.

Since the acoustic microphones 612, 612 are disposed side by side in the longitudinal direction in this way, it is possible to set the sound collection point P according to the position of the vocal cord VC or the like that is different depending on the seated person. It is possible to efficiently collect voice of the seated person. That is, for example, even when it is difficult to vertically adjust the position of the sound collecting device 610 because of, for example, limitation of a setting space, by vertically adjusting the sound collection point P, it is possible to efficiently collect voice of the seated person. In a configuration in which the vertical height of the sound collecting device 610 can be changed, it is possible to secure larger vertical adjustment width of the sound collection point P.

Note that, in the fourth to sixth embodiments, the sound collecting devices 410, 510, and 610 are explained as being attached to the headrest stays 405, 405 by the magnets 407, 407. However, the present invention is not limited to this. For example, the sound collecting device may be fastened by bolts or the like and attached to the headrest stays 405, 405.

REFERENCE SIGNS LIST 10, 210, 310, 370 Headrest devices
12 Cushion core material (core material, headrest main body)
12a Front surface
41 Acoustic-device attachment surface (shock resistant surface)
50 Acoustic speaker
51, 251, 351 Acoustic microphones (acoustic devices)
61, 261, 361 Sound collecting sections (sound collecting mechanisms)
61a, 261a, 361a Sound collection opening sections (openings)
400 Seat
401 Headrest
402 Seat back section
405 Headrest stay
408, 508, 608 Sound collecting sections (sound collecting sections opened to a seated person side)
411 Attachment section
412, 512, 612 Acoustic microphones

The invention claimed is:
1. A headrest device comprising:
a headrest main body;
a shock resistant surface formed in a core material of the headrest main body;
a sound collecting section formed in a conical shape; and
a non-contact type acoustic microphone,
wherein an opening section is formed in the shock resistant surface, the sound collecting section is tapered from the opening section toward an inner side of the core material and collects sound, the non-contact type acoustic microphone is disposed on an inner side of the sound collecting section, and at least a portion of the sound collecting section is located between the opening section of the core material and the non-contact type acoustic microphone.
2. The headrest device according to claim 1, wherein the acoustic microphone is disposed in a form adapted to a test performed using a head form provided for in details of a safety standard for a road transport vehicle.
3. The headrest device according to claim 1, wherein the sound collecting section is formed in a substantially circular conical shape.
4. The headrest device according to claim 1, wherein the opening is formed on a front surface of the headrest main body.
5. The headrest device according to claim 1, wherein
a plurality of acoustic speakers are disposed around the acoustic microphone, and
the acoustic speakers are disposed outward with respect to the acoustic microphone.

6. The headrest device according to claim 1, wherein a front of the acoustic microphone is covered with a material that allows sound to easily pass.

7. The headrest device according to claim 1, wherein a plurality of acoustic microphones are disposed side by side in a lateral direction.

8. The headrest device according to claim 1, wherein a plurality of acoustic microphones are disposed side by side in a longitudinal direction.

9. A sound collecting device comprising:
   an attachment section attached to a headrest stay that connects a headrest of a seat to a seat back section;
   a fixing section directly fixed to a rear surface of the headrest stay;
   a non-contact type acoustic microphone supported by the attachment section,
   wherein the fixing section and the non-contact type acoustic microphone are provided on a front surface of the attachment section, so that the sound collecting device is disposed at a rear surface side of the headrest stay.

10. The sound collecting device according to claim 9, wherein
    the attachment section includes a sound collecting section opened to a seated person side, and
    the acoustic microphone is disposed in the sound collecting section.

11. The sound collecting device according to claim 10, wherein the sound collecting section is formed in one of a substantially conical shape and a substantially pyramidal shape.

12. The sound collecting device according to claim 9, wherein
    the attachment section is attached between a pair of the headrest stays, and
    the acoustic microphone is disposed in an intermediate section between the pair of headrest stays.

13. The sound collecting device according to claim 9, wherein a plurality of acoustic microphones are disposed side by side in a lateral direction.

14. The sound collecting device according to claim 9, wherein a plurality of acoustic microphones are disposed side by side in a longitudinal direction.

* * * * *